(12) United States Patent
Willard, III et al.

(10) Patent No.: US 12,077,381 B2
(45) Date of Patent: *Sep. 3, 2024

(54) RETURN ORDERING SYSTEM AND METHOD

(71) Applicant: America's Collectibles Network, Inc., Knoxville, TN (US)

(72) Inventors: George F. Willard, III, Knoxville, TN (US); Lei Cao, Oak Ridge, TN (US); Mahendra Satrasala, Knoxville, TN (US); G. Shannon Meade, Knoxville, TN (US); Bradley K. Waller, Lenoir City, TN (US); Stephen C. Nobert, Knoxville, TN (US)

(73) Assignee: America's Collectibles Network, Inc., Knoxville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,320

(22) Filed: Nov. 7, 2022

(65) Prior Publication Data

US 2023/0306361 A1    Sep. 28, 2023

Related U.S. Application Data

(63) Continuation of application No. 16/796,714, filed on Feb. 20, 2020, now abandoned, which is a
(Continued)

(51) Int. Cl.
*B65G 1/137*    (2006.01)
*G06Q 10/0837*    (2023.01)

(52) U.S. Cl.
CPC .......... *B65G 1/1373* (2013.01); *B65G 1/1376* (2013.01); *B65G 1/1378* (2013.01); *G06Q 10/0837* (2013.01)

(58) Field of Classification Search
None
See application file for complete search history.

(56) References Cited

U.S. PATENT DOCUMENTS

| 7,346,564 | B1 | 3/2008 | Kirklin et al. |
| 7,739,138 | B2 | 6/2010 | Chauhan et al. |

(Continued)

FOREIGN PATENT DOCUMENTS

| EP | 1814092 A2 | 8/2007 |
| WO | 2015184253 A1 | 12/2015 |

OTHER PUBLICATIONS

Chism, C. (2010). Optimizing and benchmarking returnable container processes within an automotive distribution system (Order No. 1549064). Available from ProQuest Dissertations and Theses Professional. (1475266281). (Year: 2010).*

(Continued)

*Primary Examiner* — Gurkanwaljit Singh
(74) *Attorney, Agent, or Firm* — Nelson Mullins Riley & Scarborough LLP; Anthony A. Laurentano

(57) ABSTRACT

The customer order fulfillment and return system for returning items from a customer order to specified locations in a warehouse. The returned items are assigned to specific sub-compartments of a tote, and the tote is assigned to a specific mobile return cart. The system then generates a return tour and the returned items are then returned to specific locations in the warehouse.

26 Claims, 23 Drawing Sheets

Related U.S. Application Data continuation-in-part of application No. 16/773,821, filed on Jan. 27, 2020, now Pat. No. 11,113,648, which is a continuation-in-part of application No. 16/727,676, filed on Dec. 26, 2019, now Pat. No. 11,195,129, which is a continuation-in-part of application No. 16/514,897, filed on Jul. 17, 2019, now Pat. No. 11,120,378.

(60) Provisional application No. 62/700,619, filed on Jul. 19, 2018.

(56) References Cited

U.S. PATENT DOCUMENTS

| | | | |
|---|---|---|---|
| 7,853,492 | B1 | 12/2010 | Kirklin et al. |
| 8,175,925 | B1 | 5/2012 | Rouaix |
| 8,401,975 | B1 | 3/2013 | Tian et al. |
| 8,407,110 | B1 | 3/2013 | Joseph et al. |
| 9,466,045 | B1 | 10/2016 | Kumar |
| 9,602,381 | B1 | 3/2017 | Jordan et al. |
| 10,186,143 | B2 | 1/2019 | Ali-Jarad |
| 10,196,210 | B2* | 2/2019 | Welty ................. B25J 5/007 |
| 10,489,802 | B1 | 11/2019 | Zhdanov et al. |
| 10,489,870 | B2* | 11/2019 | Asaria ................. G06Q 50/28 |
| 10,558,214 | B2* | 2/2020 | Jaquez ................ G05D 1/0088 |
| 11,113,648 | B2 | 9/2021 | Willard, III et al. |
| 11,120,378 | B1 | 9/2021 | Willard, III et al. |
| 11,138,866 | B2 | 10/2021 | Gravel et al. |
| 11,158,017 | B2* | 10/2021 | Yao ............... G06Q 10/063112 |
| 11,195,129 | B2 | 12/2021 | Willard, III et al. |
| 2002/0024435 | A1 | 2/2002 | Suzuki |
| 2005/0131645 | A1* | 6/2005 | Panopoulos ......... G05D 1/0244 |
| | | | 701/472 |
| 2006/0290519 | A1 | 12/2006 | Boate |
| 2007/0187183 | A1* | 8/2007 | Saigh .................. E04H 14/00 |
| | | | 186/53 |
| 2008/0301009 | A1 | 12/2008 | Plaster et al. |
| 2011/0055289 | A1 | 3/2011 | Ennis |
| 2011/0143768 | A1 | 6/2011 | Lane et al. |
| 2011/0261049 | A1 | 10/2011 | Cardno et al. |
| 2013/0317642 | A1* | 11/2013 | Asaria ................. G06Q 50/28 |
| | | | 700/216 |
| 2014/0040075 | A1 | 2/2014 | Perry et al. |
| 2014/0278828 | A1* | 9/2014 | Dorcas .............. G06Q 30/0207 |
| | | | 705/7.42 |
| 2015/0172856 | A1 | 6/2015 | Vanderwater et al. |
| 2016/0049064 | A1 | 2/2016 | McNabb |
| 2016/0110833 | A1 | 4/2016 | Fix |
| 2016/0217399 | A1 | 7/2016 | Roelofs et al. |
| 2016/0381537 | A1 | 12/2016 | R |
| 2017/0091704 | A1* | 3/2017 | Wolf .................... G06Q 10/043 |
| 2017/0124836 | A1 | 5/2017 | Chung |
| 2018/0114430 | A1 | 4/2018 | Westmacott |
| 2018/0182054 | A1* | 6/2018 | Yao ........................ G06Q 50/28 |
| 2018/0201444 | A1* | 7/2018 | Welty ...................... B25J 5/007 |
| 2018/0253680 | A1* | 9/2018 | Jahani ................ G06Q 30/0633 |
| 2019/0027015 | A1 | 1/2019 | Hsu |
| 2019/0213530 | A1 | 7/2019 | Wolf et al. |
| 2019/0243358 | A1* | 8/2019 | Jaquez ................. G05D 1/0276 |
| 2019/0287063 | A1* | 9/2019 | Skaaksrud .......... G05D 1/0223 |
| 2020/0265381 | A1 | 8/2020 | Willard, III et al. |
| 2020/0272970 | A1 | 8/2020 | Willard, III et al. |
| 2020/0311644 | A1 | 10/2020 | Willard, III et al. |

OTHER PUBLICATIONS

Karlin, J. N. (2004). Defining the lean logistics learning enterprise: Examples from toyota's north american supply chain (Order No. 3121959). Available from ProQuest Dissertations and Theses Professional. (Year: 2004).*

Accorsi, Riccardo, et al., "A decision-support system for the design and management of warehousing systems," Computers in Industry, vol. 65.1 (2014): 175-186. (2014).

Chism, C., Optimizing and benchmarking returnable container processes within an automotive distribution system (Order No. 1549064). Available from ProQuest Dissertations and Theses Professional. (1475266281, 57 pages (2010).

Communication, dated Sep. 10, 2019, from European Patent Application No. 19163213.2, filed on Mar. 15, 2019. 7 pages.

Frazelle, E. H., Stock location assignment and order picking productivity (Order No. 9120762). Available from ProQuest Dissertations and Theses Professional (1989).

Karlin, J. N., "Defining the lean logistics learning enterprise: Examples from toyota's north american supply chain (Order No. 3121959)," Available from ProQuest Dissertations and Theses Professional, 222 pages (2004).

Kim, B. S., Dynamic slotting and cartonization problem in zone-based carton picking systems (Order No. 3394621), Available from ProQuest Dissertations and Theses Professional, (2009).

Ow Yong, M. G., Order batching design for a modular fulfillment center (Order No. 3418241). Available from ProQuest Dissertations and Theses Professional (2009).

Van den Berg, et al., "Models for warehouse management: Classification and examples." International Journal of Production Economics, vol. 59.1-3:519-528. (1999).

Zhao, X., A business process driven approach for automatic generation of business applications (Order No. NR78480), Available from ProQuest Dissertations and Theses Professional (2011).

* cited by examiner

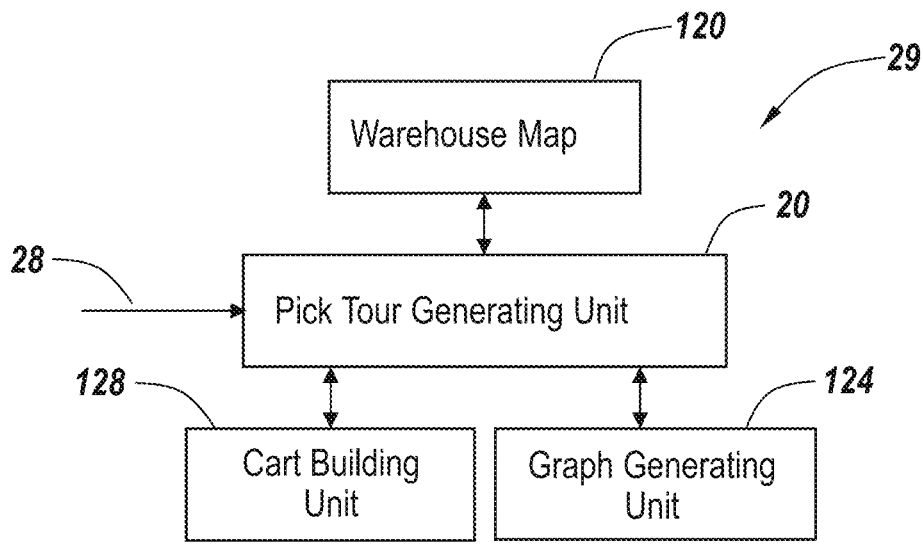
FIG. 8
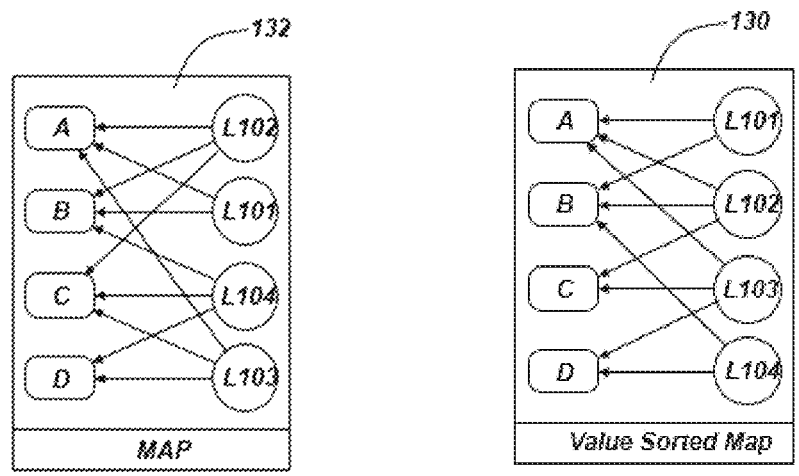
FIG. 9A  FIG. 9B

PICK TOUR

| SEQUENCE | LOCATION | SHIPMENT | PRODUCT_ID | QTY | SLOT | CLOSED |
|---|---|---|---|---|---|---|
| 1 | J102-001 | 1 | ABC123 | 1 | 1 | N |
| 2 | J102-003 | 2 | DEF345 | 1 | - | Y |
| 3 | J102-004 | 3 | DQK928 | 1 | - | Y |
| 4 | J102-004 | 4 | DQK928 | 2 | 2 | N |
| 5 | K103-001 | 4 | BLE985 | 1 | 2 | Y |
| 6 | R101-004 | 1 | MOS634 | 3 | 1 | Y |

FIG. 13

RETURN ORDERING SYSTEM AND METHOD

RELATED APPLICATIONS

The present application is a continuation of U.S. patent application Ser. No. 16/796,714, filed on Feb. 20, 2020, and entitled RETURN ORDERING SYSTEM AND METHOD, which is a continuation-in-part of U.S. Pat. No. 11,113,648, filed on Jan. 27, 2020, and entitled MULTI-LINE SYSTEM AND METHOD FOR RETRIEVING AND FULFILLING ITEMS IN A CUSTOMER ORDER, which is a continuation-in-part of U.S. Pat. No. 11,195,129, filed on Dec. 26, 2019 and entitled SYSTEM AND METHOD FOR PERFORMING BULK PICK OF ITEMS OF A CUSTOMER ORDER, which in turn is a continuation-in-part of U.S. Pat. No. 11,120,378, entitled SYSTEM AND METHOD FOR PERFORMING BULK PICK OF ITEMS OF A CUSTOMER ORDER, filed on Jul. 17, 2019, which claims priority to provisional patent application Ser. No. 62/700,619, filed on Jul. 19, 2018, and entitled SYSTEM AND METHOD FOR PERFORMING BULK PICK OF ITEMS OF A CUSTOMER ORDER. The contents of all of the foregoing patents and applications are incorporated herein by reference.

BACKGROUND OF THE INVENTION

Vendors, particularly in home shopping industries involving telephone ordering, mail ordering, or e-commerce, often need to fulfill and package customer orders to be shipped to customers. The customer order may include one or more product items, as well as promotional literature. In some circumstances, product fulfillment and packaging may be done manually with a worker picking items corresponding to the customer order from a fulfillment center or warehouse and then inserting orders into packages. In order to increase efficiency over conventional manual picking and packaging techniques, automated picking stations and packing machines have been introduced. However, such picking processes are designed to have a person simply pick an item from a selected location and then transfer the item to a packing station for packaging, without regard to optimizing the pick route or picking and packaging process.

Further, conventional item picking and packaging systems require large capital investments, and still are not fully adapted to optimize the item picking and packaging process.

SUMMARY OF THE INVENTION

The present invention is directed to an order fulfillment system that receives and processes customer orders, and then determines whether the specific items in the collected customer orders warrant the creation and execution of a bulk pick or a pick tour to be executed by a pick agent. If the system determines that a series of pick tours are required, the pick tour subsystem receives information from the order collection unit, determines the location of the items in the warehouse based on a warehouse map, instructs the pick agent how to manage or setup a mobile pick cart, generates a value sorted tree map, and then generates a pick tour plan. The pick tour plan is then converted into a pick tour to be performed by the pick tour agent. In the pick tour, the location of the items in the warehouse are proved to the pick agent and the pick tour agent is instructed to select the items at specific locations in a predefined sequence.

Further, the order fulfillment system can include a return order generating unit for allowing an agent to process items that are retuned by the customer. The return agent can build a return cart that has a plurality of return totes associated therewith. The order fulfillment system can generate a return tour, similar to the pick tour but in reverse, wherein the items in the return totes of the return cart can be returned to selected locations within the warehouse or to an automated fulfillment system. Specifically, the customer order fulfillment and return system of the present invention returns items from a customer order to specified locations in a warehouse. The returned items are assigned to specific sub-compartments of a tote, and the tote is assigned to a specific mobile return cart. The system then generates a return tour and the returned items are then returned to specific locations in the warehouse.

The present invention includes a customer order fulfillment system for returning items from a customer order to one or more locations in a warehouse, the system includes a return order generating subsystem for assigning returned items in a tote having one or more sub-compartments to a return cart and an interface. The return order generating sub-system includes a map unit for storing a map having map data associated therewith that corresponds each of the returned items with the one or more locations in the warehouse; a return cart building unit for assigning a plurality of the totes to the return cart, wherein each of the plurality of totes has identification information associated therewith and the return cart has identification information associated therewith, wherein the identification information of the plurality of totes and the return cart are correlated together; and a return order generating unit for generating a return tour for the returned items assigned to the return cart, the return tour having return instructions associated therewith, wherein the return instructions of the return tour correlate the returned items in each of the plurality of totes of the return cart to the locations in the warehouse. The interface provides a visual representation of the tote and the associated one or more sub-compartments, and providing a visual indicator of the returned items assigned to the one or more sub-compartments of the tote.

The interface can also include a window having a visual representation of one or more of the totes and the sub-compartments and for performing the return tour for returning the returned items in the sub-compartments to a plurality of locations in the warehouse, and a visual representation of one or more of the totes and the sub-compartments for performing a return tour for returning the returned items in the sub-compartments to an automated fulfillment system.

The customer order fulfillment system of the present invention includes an order collection unit for collecting information associated with a plurality of customer orders from a plurality of customers and generating customer order data that includes data associated with each of the plurality of customer orders and the plurality of customers, wherein each of the plurality of customer order includes one or more items associated therewith; an order generating unit for receiving the customer order data from the order collection unit and generating in response thereto consolidated order fulfillment data; and a pick tour generating subsystem for receiving the consolidated order fulfillment data from the order generating unit and in response thereto generating pick instructions associated with a pick tour plan or a pick tour from the consolidated order fulfillment data. Further, the order fulfillment system includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, and an automated fulfillment system for receiving the consolidated order fulfillment data from the order generating unit and for automatically selecting one or more of the items in the customer order from one or more carousels associated therewith. The automated fulfillment system is configured for receiving the pick tour plan or the pick tour and for automatically selecting the items in the customer order set forth in the pick tour plan or the pick tour from the one or more carousels, and/or is configured for receiving one or more of the plurality of bulk picks forming the bulk tour or automatically selecting one or more of the items in the customer order from the one or more carousels.

The pick tour generating subsystem comprises a map unit for storing a map having map data associated therewith that corresponds to a location for each of the items in a warehouse; a cart building unit for generating information associated with a mobile cart for use by a pick agent, wherein the mobile cart has a plurality of totes associated therewith and wherein each of the plurality of totes includes identification information; a graph generating unit for generating a value sorted tree graph by employing a value sorted tree mapping technique based on the map data and the consolidated order fulfillment data, and wherein the value sorted tree graph includes data associating one or more of the items from the plurality of customer orders with a selected location in the warehouse; and a pick tour generator for generating a pick tour plan based on the value ordered tree graph and the map data, wherein the pick tour plan correlates items of the customer orders at multiple selected locations in the warehouse with one or more of the plurality of totes in the mobile cart. The cart building unit determines the number of the totes for the mobile cart and the identification information associated with each of the plurality of totes based on the pick tour plan.

According to another aspect of the invention, one or more of the plurality of totes includes a plurality of sub-compartments where each of the plurality of sub-compartments includes identification information. The totes can be arranged on the mobile cart according to the requirements of the pick tour plan and optionally according to the sequence of the locations of the items in the warehouse.

According to another aspect of the invention, the value sorted tree graph is an associative array data type having values associated therewith, wherein the value sorted tree graph sorts the values in a selected order. The values correspond to the locations in the warehouse or to a number of the items at the locations in the warehouse. Further, the locations within the warehouse include one or more bays associated with each location in the warehouse, and the pick tour plan comprises plan data correlating the location of the bay with selected ones of the items at the locations of the bays to be placed in specific totes in the mobile cart.

According to still another aspect of the invention, the pick tour plan is generated by the pick tour generator by mapping the consolidated order fulfillment data generated by the order generating unit with the warehouse configuration stored in the map unit via the graph generating unit. The pick tour generator converts the pick tour plan into a pick tour that sets forth an ordered list of pick tasks. Further, each of the pick tasks includes a selected one of the following: the location of the bay, identification information associated with the location of the bay, shipping information associated with one or more of the customer orders, a quantity of the items, identification information associated with each of the items, one or more of the items to be picked from the bay, and the tote on the mobile cart in which to place the picked items. The pick tour generator generates the pick tour based on a similarity in the customer orders and the location of the items in the warehouse.

According to yet another aspect of the invention, the system further includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, The bulk pick order fulfillment unit groups the items in the consolidated order fulfillment data into shipments according to one or more predetermined logical parameters. Still further, the bulk pick order fulfillment unit includes processing hardware that is configured to map the one or more items in each of the plurality of customer orders to product identification data, generate one or more bulk picks having associated therewith one or more bulk pick recipes from the data associated with the customer orders, wherein each of the bulk pick recipes includes a selected quantity of the one or more items from the plurality of customer orders and a selected quantity of one or more additional items, and generate a bulk pick ticket associated with each of the bulk picks.

The bulk pick ticket includes information about the one or more items in the bulk pick recipe, and location information associated with the location of the one or more items in the warehouse. The bulk pick order fulfillment unit generates a connected graph of groupings of the items from the customer orders and the one or more additional items, wherein the items from the customer orders and the additional items form nodes of the connected graph.

According to another aspect of the invention, the system can also include a packing and shipping sub-system for packing and shipping the items from the customer orders, as well as a controller for scheduling one or more selected time periods for performing the bulk pick tour or the pick tour.

The present invention is also directed to a method for retrieving items from a customer order from a warehouse so as to fulfill a customer order, comprising collecting information associated with a plurality of customer orders from a plurality of customers and generating customer order data that includes data associated with each of the plurality of customer orders and the plurality of customers, wherein each of the plurality of customer order includes one or more items associated therewith; generating in response to the customer order data consolidated order fulfillment data; and receiving the consolidated order fulfillment data and generating pick tour instructions associated with a pick tour from the consolidated order fulfillment data by a pick tour generating subsystem.

The method also includes receiving the consolidated order fulfillment data from the order generating unit and grouping together similar ones of the items associated with the plurality of customer orders to form a plurality of bulk picks with the bulk pick order fulfillment unit, wherein one or more of the plurality of bulk picks can form part of one or more bulk pick tours, and receiving the consolidated order fulfillment data from the order generating unit and for automatically selecting one or more of the items in the customer order from one or more carousels with the automated fulfillment system. The automated fulfillment system is configured for receiving the pick tour plan or the pick tour and for automatically selecting the items in the customer order set forth in the pick tour plan or the pick tour from the one or more carousels, and is configured for receiving one or more of the plurality of bulk picks for automatically selecting one or more of the items in the customer order from the one or more carousels.

According to another aspect of the invention, the method includes generating the pick tour plan by mapping the consolidated order fulfillment data generated by the order generating unit with the warehouse configuration stored in the map unit via the graph generating unit. The method can also include converting with the pick tour generator the pick tour plan into a pick tour that sets forth an ordered list of pick tasks.

According to still another aspect of the invention, the method also includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours. The method can also include grouping the items in the consolidated order fulfillment data into shipments according to one or more predetermined logical parameters.

BRIEF DESCRIPTION OF DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 8 is a schematic block diagram illustrating the pick tour generating unit and associated components according to the teachings of the present invention.

FIG. 9A is a schematic representation of a conventional unsorted tree map generated according to known techniques.

FIG. 9B is a schematic representation of a value sorted tree map generated by the graph generating unit according to the teachings of the present invention.

FIG. 13 is a schematic representation of a pick tour generated from a pick your plan by the pick tour generating unit according to the teachings of the present invention.

DETAILED DESCRIPTION

Exemplary embodiments of the present invention address these and other problems associated with the picking of items corresponding to a customer order by employing an order fulfillment system for picking the items and then packaging and shipping the items to the customer.

The present invention is directed to a time based customer ordering and customer order consolidation system suitable for use in an automated or partially automated order fulfillment environment. The customer order can include one or more items that the customer has selected or purchased, and can if desired include additional items, such as warranty information, sales or promotional literature and related brochures, item instructions and the like.

Figure 1:
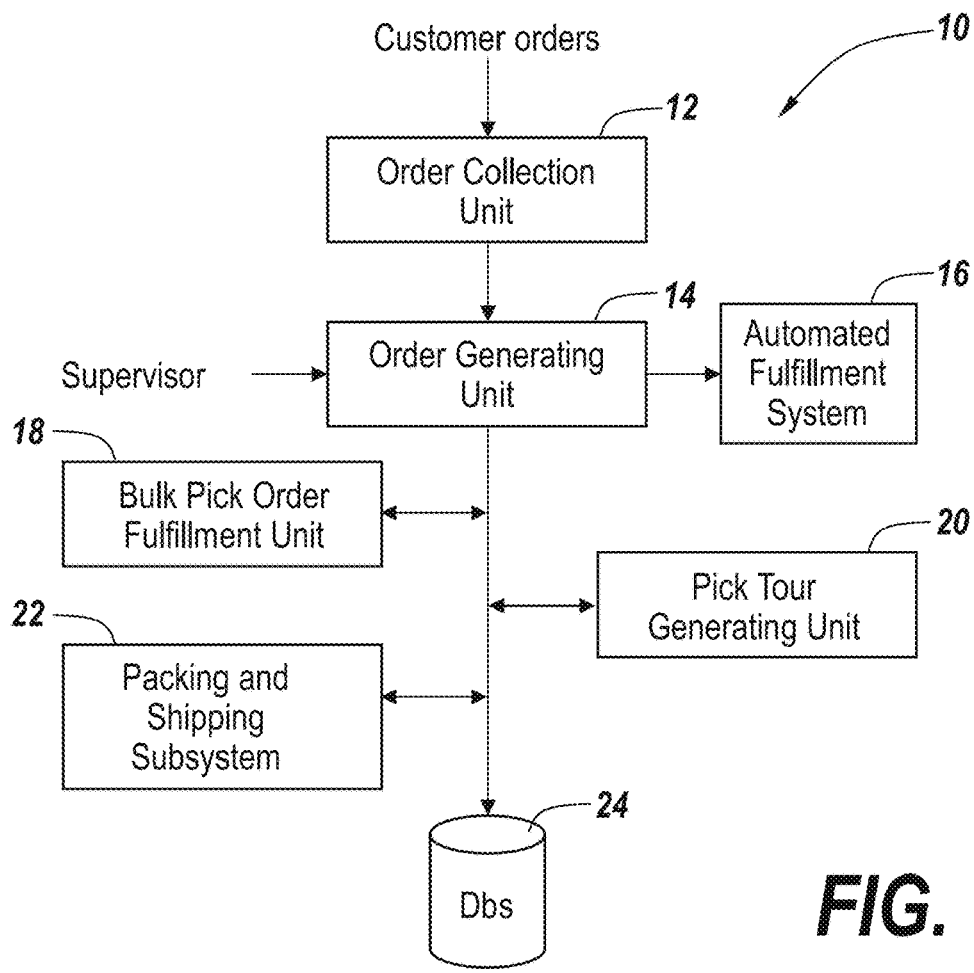
FIG. 1 is a schematic block diagram of the order fulfillment system of the present invention.

As shown in FIG. 1, the order fulfillment system 10 of the present invention includes an order collation or collection unit 12 for collecting or collating customer orders and associated data as they are entered into the system. As is known in the art, the customer orders can be introduced or entered into the system either through the Internet via a website ordering operation or can be entered into the system by a customer service representative while accepting order instructions directly from the customer, such as over a telephone. The customer order collection unit 12 in connection with the database 24 can generate customer and order information or data that is transmitted and received by an order generating unit 14. The order collection unit 12 consolidates the incoming customer orders and organizes and consolidates selected order and customer information from the customer orders, including for example the customer ID, the shipment address, type of shipment, number of items in the customer order, and the like. This information can be stored at one or more locations, including for example the database 24. The order generating unit 14 is configured for controlling and managing the order data for fulfillment at a warehouse and/or automated fulfillment system in a time based manner. As used herein, the term "warehouse" is intended to include any facility or building that stores items therein for retrieval by personnel and/or an automated fulfillment system for subsequent shipping to, for example, a customer or another building. The warehouse can include for example a fulfillment facility. The order data is preferably organized and managed by the order generating unit 14 so as to optimize the selection (e.g., picking) of the items in the customer order and then shipping the items to the customer in an expeditious manner.

The order generating unit 14 can be monitored by a separate computing system and/or a warehouse supervisor via the computing system to determine the order fulfillment actions that need to be taken. The order generating unit 14 is adapted or configured to prepare a set of order fulfillment instructions or data for fulfilling the incoming customer orders in a time based manner. The fulfillment order instructions can be based on a set of logical rules and ordering priorities for releasing one or more customer orders to be fulfilled by the order fulfillment system 10.

Figure 17:
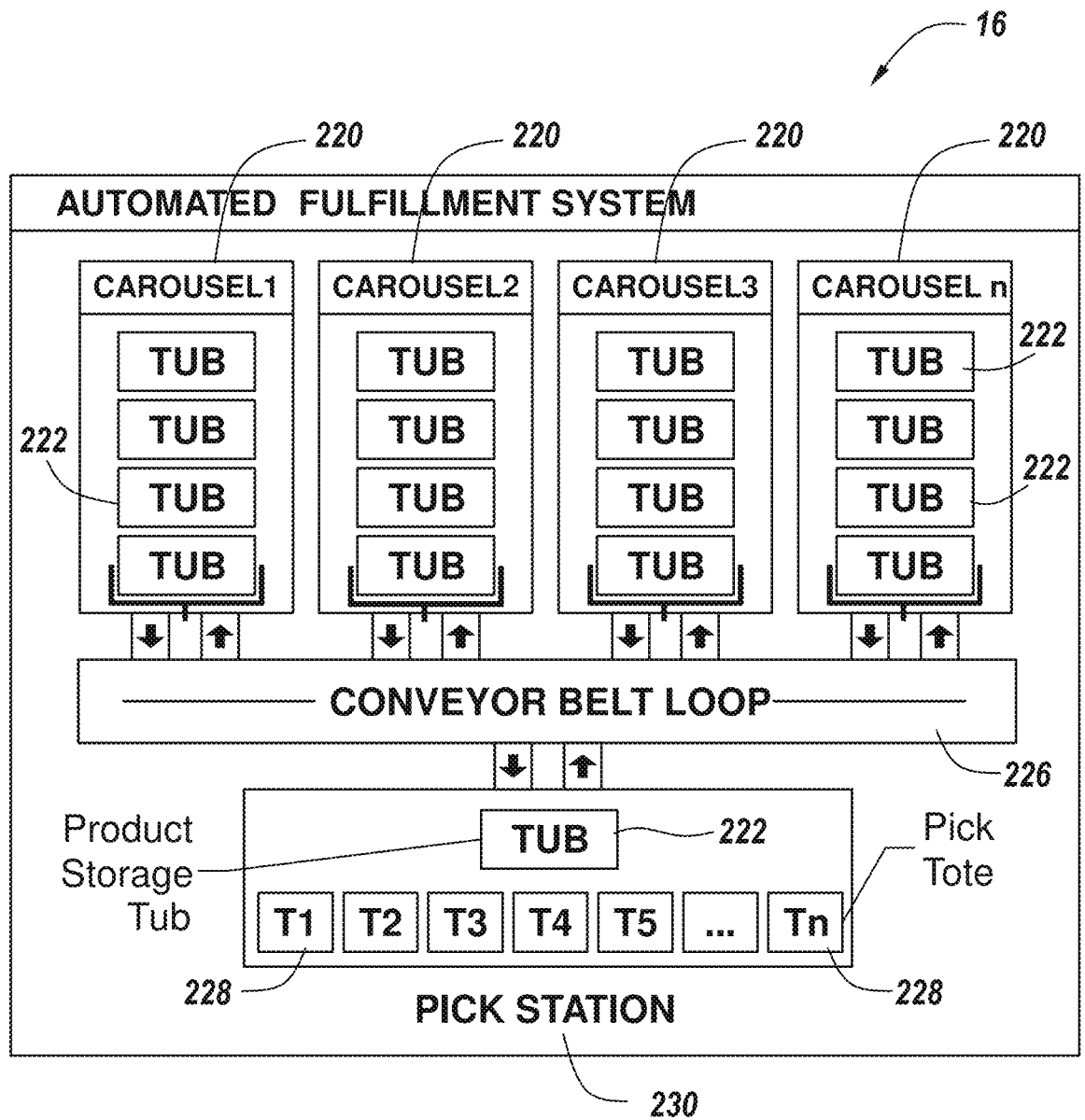
FIG. 17 is a schematic representation of the automated fulfillment system of the present invention.

The consolidated order fulfillment instructions or data generated by the order generating unit 14 can be transmitted to an automated fulfillment system 16, such as an automated product picking system, as shown for example in FIG. 17. An example of an automated product picking system suitable for use with the present invention includes the systems manufactured and sold by SSI Schaefer, Germany. As is known in the art, the automated fulfillment system 16 can include a series of vertical towers, stacks or carousels that include a number of distinct receptacles for storing one or more items. The stacks can be stationary or adapted to rotate about a central longitudinal axis. The stacks can be coupled to one or more movable retrieval arms or mechanisms that are adapted to move vertically along the stacks and if desired between the stacks. The items or products retrieved by the movable arms can be placed in one or more totes or bins, which in turn can be moved or conveyed along a conveyance system. The conveyance system can include tracks with rollers and the like. The automated fulfillment system 16 can be controlled or operated by a central or a dedicated computing system.

Figure 18:
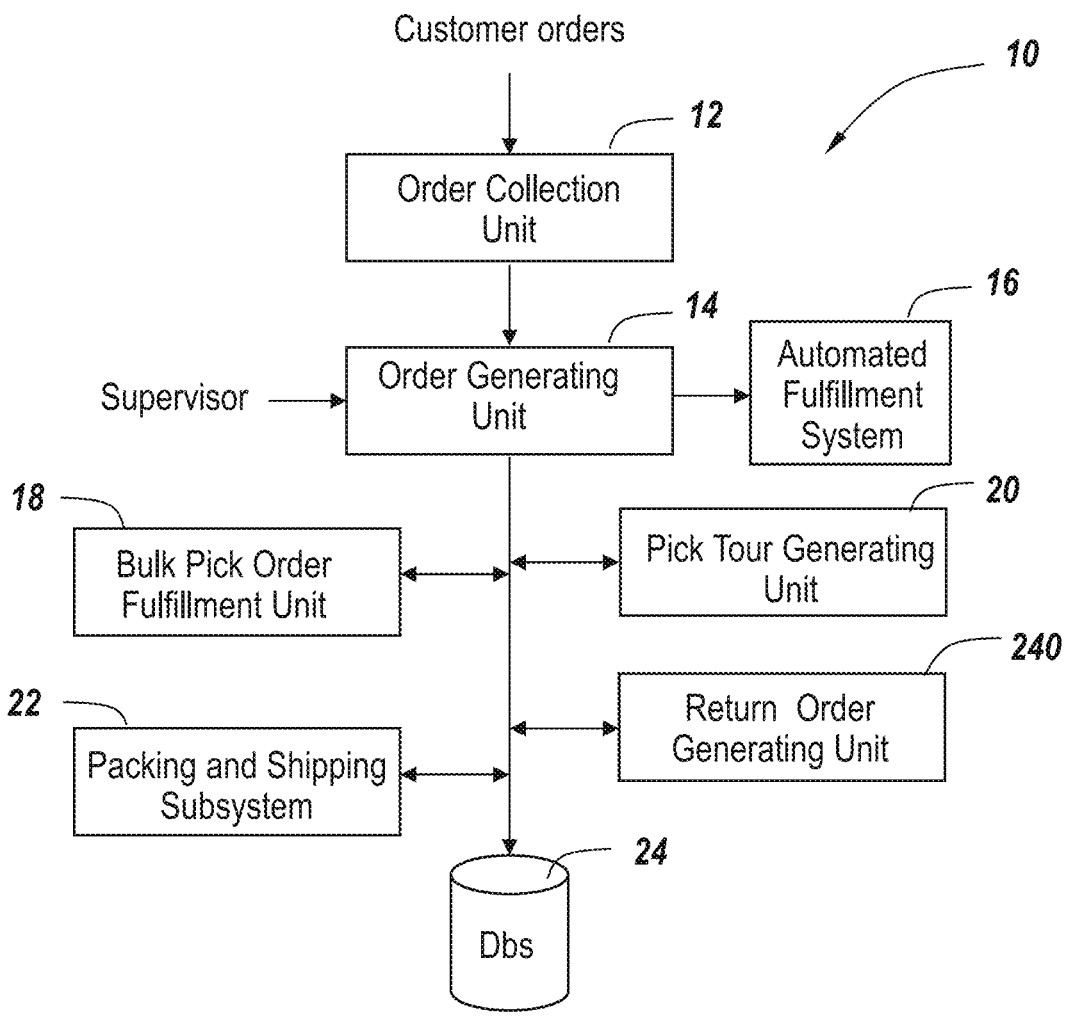
FIG. 18 is a schematic block diagram of the order fulfillment system of the present invention that includes a return order generating unit.

Alternatively, the order generating unit 14 can transmit the order fulfillment instructions to a bulk pick order fulfillment unit 18. For example, according to one practice, the order generating unit 14 can be configured to group together a set of customer orders that share similar features, items or traits, into a larger bulk pick order, and the bulk pick order data can be transmitted to the bulk pick order fulfillment unit 18. Alternatively, the bulk pick order fulfillment unit 18 can generate the bulk pick order data from the consolidated order fulfillment data from the order generating unit 14. The bulk pick orders (e.g., a bulk pick order wave) are groupings of customer orders that may be picked or fulfilled in aggregate in a warehouse and/or the automated fulfillment system 16 as opposed to fulfilling each customer order separately and independently. As such, warehouse data can include the configuration of the warehouse, which can include for example rows of storage racks with associated storage bins, and data associated with specific items located in specific bins at specific warehouse locations, can be stored in the database 24 or elsewhere in the system 10 and is accessible by the order generating unit 14, the bulk pick order fulfillment unit 18, the pick tour generating unit 20, and the return order generating unit 240 (FIG. 18). The bulk pick orders forming the bulk pick wave are selected so as to optimize the fulfillment process by selecting orders that have certain features, items or traits in common. The bulk pick order fulfillment unit 18 can generate data associated with a bulk pick that can form part of a bulk pick tour or wave, and which can be fulfilled by the automated product picking system 16, by one or more mobile operators or pick agents that manually pick one or more items corresponding to the bulk pick tour, or by both. As used herein, the term "bulk pick," "bulk pick tour," or "bulk pick wave," is intended to mean a plurality of similar or identical items that are grouped or bulked together and which can be selected based on the warehouse data from a selected warehouse location. The bulk picks or grouped items when assigned to the automated fulfillment system and/or to a pick tour agent for retrieval form the bulk pick tours. A series of the bulk picks or bulk pick tours can then be assigned to the pick agents and/or to the automated fulfillment unit separately, concurrently or in series, to form a bulk pick wave.

Additionally or alternatively, the order generating unit 14 can interface with a pick tour generating unit 20, which receives the order fulfillment data from the order generating unit 14. The pick tour generating unit 20 can generate pick tour instructions for a single item or a multi-item order. The pick tour instructions can be forwarded to the automated product picking system and/or to a pick tour mobile operator or agent for performing a pick tour. The pick tour generating unit 20 generates pick tour instructions based on the consolidated customer order information received from the order generating unit 14. The pick tour instructions leverage the similarity in customer orders and item locations within the warehouse so as to minimize the amount of time it takes to pick the one or more items that comprise the customer order. The pick tour instructions can generate or be converted into pick plan, which in turn can be used to form a pick tour that can be assigned to pick agents or mobile operators. The pick agents can utilize a mobile cart that has selected compartments associated therewith to manually pick or select the items that correspond to the customer orders from the warehouse. The pick agent can employ any suitable electronic device, such as for example a handheld scanning device, such as for example the conventional handheld scanners sold by Intermec, that can guide the pick agent to the selected location of the item and assist the pick agent in selecting the correct item. The handheld device also serves to allow the order fulfillment system 10 to track and verify the location of the pick agent, and to perform product and location verification in real time. As used herein, the term "pick tour" is intended to mean a series of instructions that include one or more pick instructions or tasks that when aggregated or consolidated together form a tour. The tour is in essence a series of instructions sent to the pick agent to pick, select or retrieve one or more items associated with one or more customer orders from selected locations within the warehouse. Alternatively, the pick tour can be performed by the automated fulfillment system 16, which receives the aggregated list of items (or tour) from the pick tour generating unit 20 and retrieves the items from selected locations within the automated fulfillment system.

Once the customer order has been picked and fully assembled, the contents of the order can be assembled into totes or compartments of totes, which are then placed on a conveyor belt and sent to a packing and shipping subsystem 22. A packaging and shipping subsystem suitable for use with the present invention includes the packing station disclosed in U.S. Publ. No. 2014/0360141, to the assignee hereof, the contents of which are herein incorporated by reference. In transit, the order fulfillment system 10 can also include structure for automatically printing a customer invoice and/or packing slips for insertion within the corresponding compartment within the tote. The illustrated packing and shipping subsystem 22 receives the totes and packages the contents of each compartment of the tote for shipping to the customer.

As shown, the illustrated order fulfillment system 10 can also include a general database 24 for storing information concerning the customers, items in the warehouse, customer orders as well as selected information corresponding to each of the illustrated units and subsystems. Specifically, the database 24 can store customer information, including customer name, address, financial payment details, order history and the like. The database 24 can also store information regarding the items that are stored in the warehouse as well as the warehouse information. The item information can include details of each item, including item type, description, price, quantity and the like. The database can also be configured to store information regarding the programs and associated segments or plays that are broadcast, as well as the sequence of items that are displayed and discussed during the program.

The order generating unit 14 of the present invention is configured to collect data associated with the customer orders from the order collection unit 12 and prepare a set of consolidated order fulfillment data or instructions for fulfilling the incoming customer orders in a time based manner. The order fulfillment instructions can be based on a set of logical rules and ordering priorities for releasing one or more customer orders to be fulfilled by the order fulfillment system 10. The order generating unit 14, based on the number of customer orders, and the overlap or similarity between the items in the orders, can send instructions to the bulk pick order fulfillment unit 18 to execute a bulk pick of selected items. The order generating unit 14 or the bulk pick order fulfillment unit 18 can schedule the bulk pick at a time of day that is convenient based on the total number of customer orders being handled, the time of day, the number of pick agents assigned to the warehouse floor, and the like.

Figure 7:
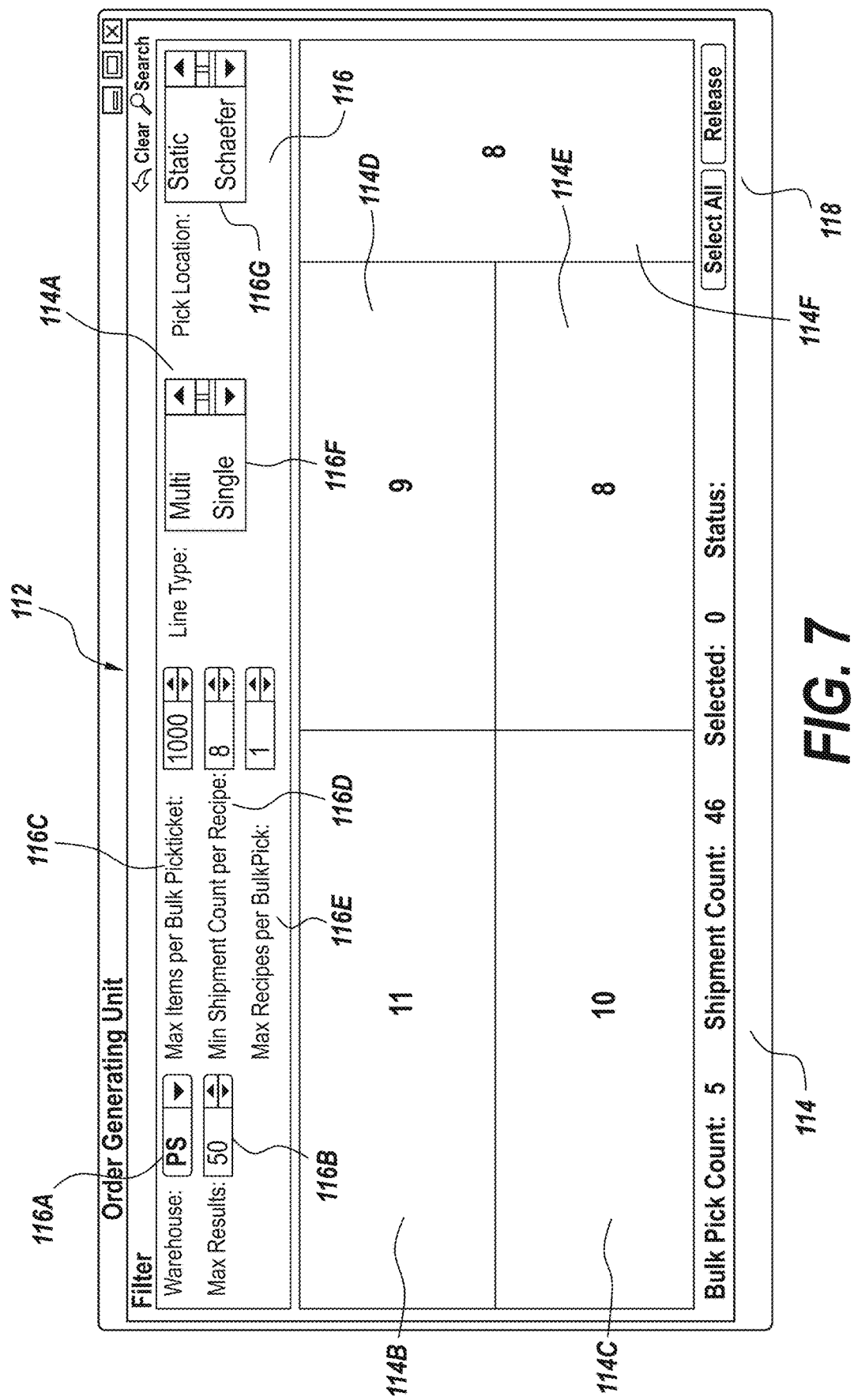
FIG. 7 is a tree map that operates as a visual representation of the relative amount of work that can potentially be fulfilled via a bulk pick order via a set of configurable operating parameters according to the teachings of the present invention.

The order generating unit 14 can generate a color coded or non-color coded tree map that can be displayed to the supervisors on a suitable display device as a visual representation of the relative amount of work that can potentially be fulfilled via a bulk pick order by the bulk pick order fulfillment unit 18 under a set of configurable operating parameters. An example of such a tree map is shown in FIG. 7. As shown, the order fulfillment system 10 can generate content that is displayed on a window or interface on a display device. The illustrated window 112 can include one or more panes 114 to display selected content associated with the customer orders and to enable or allow a user to customize via selectable parameters the metric associated with a bulk pick, bulk tour, or bulk wave. The panes 114 can include pane 114A that is positioned in an upper portion or region of the window 112 and which displays a set of user selectable parameters 116. The parameters 116 can include the selected warehouse 116A, the maximum number of results 116B to be considered by the bulk pick order fulfillment unit 18, the maximum and minimum number of different multi-item combinations (e.g., recipes) 116C to generate per bulk pick, the maximum number of recipes per bulk pick 116E, the line type 116F which includes whether a single item, multi-item, or both single item and multi-item orders should be included in the tree map and the pick location 116G (e.g., static (non-automated) or automated fulfillment system 16). The order generating unit 14 and/or the bulk pick order fulfillment unit 18 can then generate a map of the bulk wave for visual display to the user. The flexibility of these parameters enables the supervisor to adapt the amount and types of work they have pending in the order collection unit 12 to the available pick agents and availability of other system equipment, including the automated fulfillment system 16. The foregoing features or parameters can be presented to the supervisor in any suitable format, and can preferably be displayed in a dashboard format via the pane elements 114. The order generating unit 14 can release order information to the bulk pick order fulfillment unit 18 to generate bulk picks and to the pick tour generating unit 20 to generate mobile pick tours for the pick agents. The order generating unit 14 via the window 112 can display the map that can be illustrated as a set of pane elements 114A-114F. Each of the respective panel elements 114A-114F contains the total number of customer orders that are included in the bulk pick. Larger numbers are contained in larger rectangles in the tree map and are ordered such that the larger total order counts are placed in a top-to-bottom left-to-right configuration that is ordered by size. In addition to the size of the rectangle indicating the relative number of orders, the color of the rectangle may be used as a visual indicator of the estimated size or effort (e.g., red indicating a large number of orders, and blue representing a lower number of orders). This coloring technique offers a visual heat map of the orders that can be generated into bulk picks allowing a user to rapidly visually inspect the number of orders and estimate the effort involved to fulfill the respective bulk picks when released. The window 112 also displays on a bottom portion thereof parameter values selected by the user, including the bulk pick count, shipment count, as well as action buttons 118 that allow the user to select the illustrated parameters or to release the bulk wave to the system 10. As used herein, a pane element can be a user interface or portion thereof, such as a screen, a space, a surface, or the like.

The bulk pick order fulfillment unit 18 employs processing hardware for implementing heuristics and rule based schedules that determine the optimal way to group items in the customer orders into shipments. The logical parameters include consideration of the payment status of the customer or of the customer orders, destination addresses, and services such as sizing and appraisals that may have been applied to the items of the customer order. The bulk pick order fulfillment unit 18 also considers the shipping option selected by the customer and the guaranteed or estimated shipping dates that were communicated to the customer, as well as other factors, including grouping of items based on specific product brand, sales of items, and different sales channels.

Consolidating customer orders into shipments using the foregoing time-based process has multiple benefits and advantages. One advantage is that the process reduces the amount of shipment packaging materials needed, reduces the number of promotional inserts needed, and reduces the overall postage cost of shipping the packages. Additionally, customers may be incentivized to purchase additional items by reduced shipping and handling rates for additional items purchased within a selected time period, such as for example a twenty four hour time period.

Figure 2:
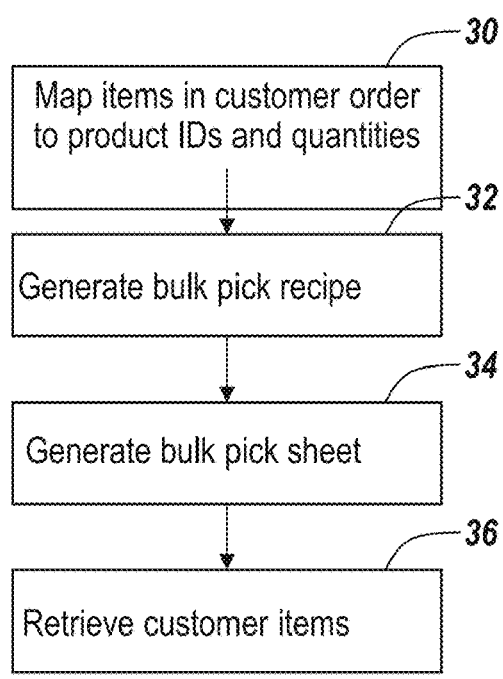
FIG. 2 is a schematic flowchart diagram illustrating the steps for generating a bulk pick recipe according to the teachings of the present invention.
Figure 3:
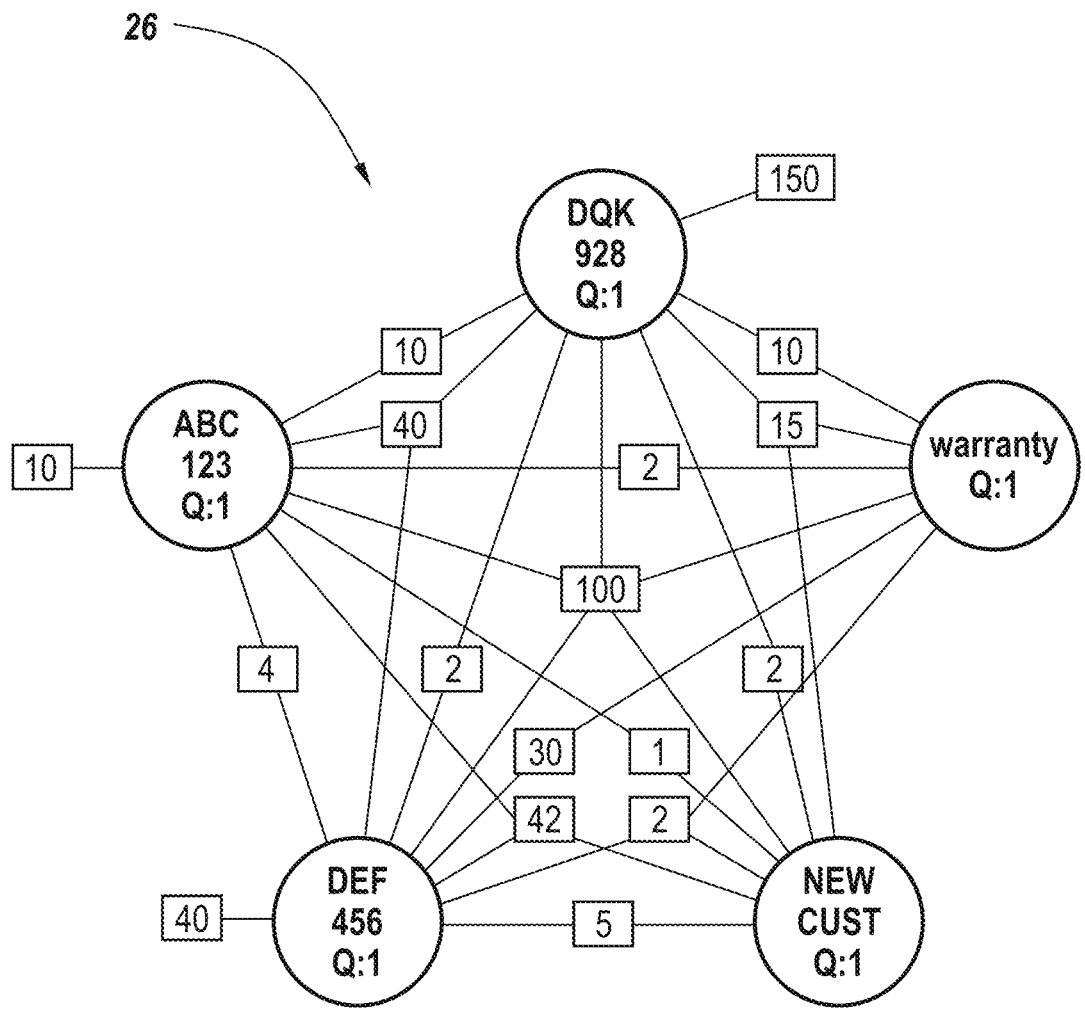
FIG. 3 is a connected tree map diagram for determining the relationship between various items in various customer orders according to the teachings of the present invention.

FIG. 2 is a schematic flow chart diagram that illustrates the process or method that the bulk pick order fulfillment unit 18 employs to generate one or more bulk picks or bulk pick recipes from the consolidated order fulfillment data received from the order generating unit 14. The bulk pick order fulfillment unit 18 includes processing hardware, such as a hardware processor or controller as described below, that is configured to initially map items in the customer order to product identification (ID) data and selected quantities of product, step 30. For example, as shown in FIG. 3, the illustrated bulk pick order fulfillment unit 18 generates a connected graph 26 of groupings of customer orders and corresponding items, and then devolves the customer orders into constituent items and corresponding inserts such as informational, warranty, and marketing materials, and places them on the connected graph as nodes. As shown, and according to a simple example, the items that form part of this potential bulk group of customer orders include three different product items designated as ABC123, DEF456, and DQK928 that were purchased by customers and forms part of the customer order data. In addition to the customer items, the example assumes that the orders also include a new customer card designated as NEW CUST and a warranty card. The number of purchased items that overlap and require warranty and new customer cards are illustrated by the connecting lines with corresponding amounts or numbers. Specifically, the number of customers that purchased selected items and require a warranty and/or new customer card are shown in the intermediate number boxes. As shown, one hundred (100) customers purchased all three items and require a warranty card and a new customer card; one hundred fifty (150) customers only purchased the item DQK928; only forty (40) customers purchased item DEF456; forty (40) customers purchased all three items and are not receiving any inserts, and so forth. Other item amounts are also shown.

Figure 4:
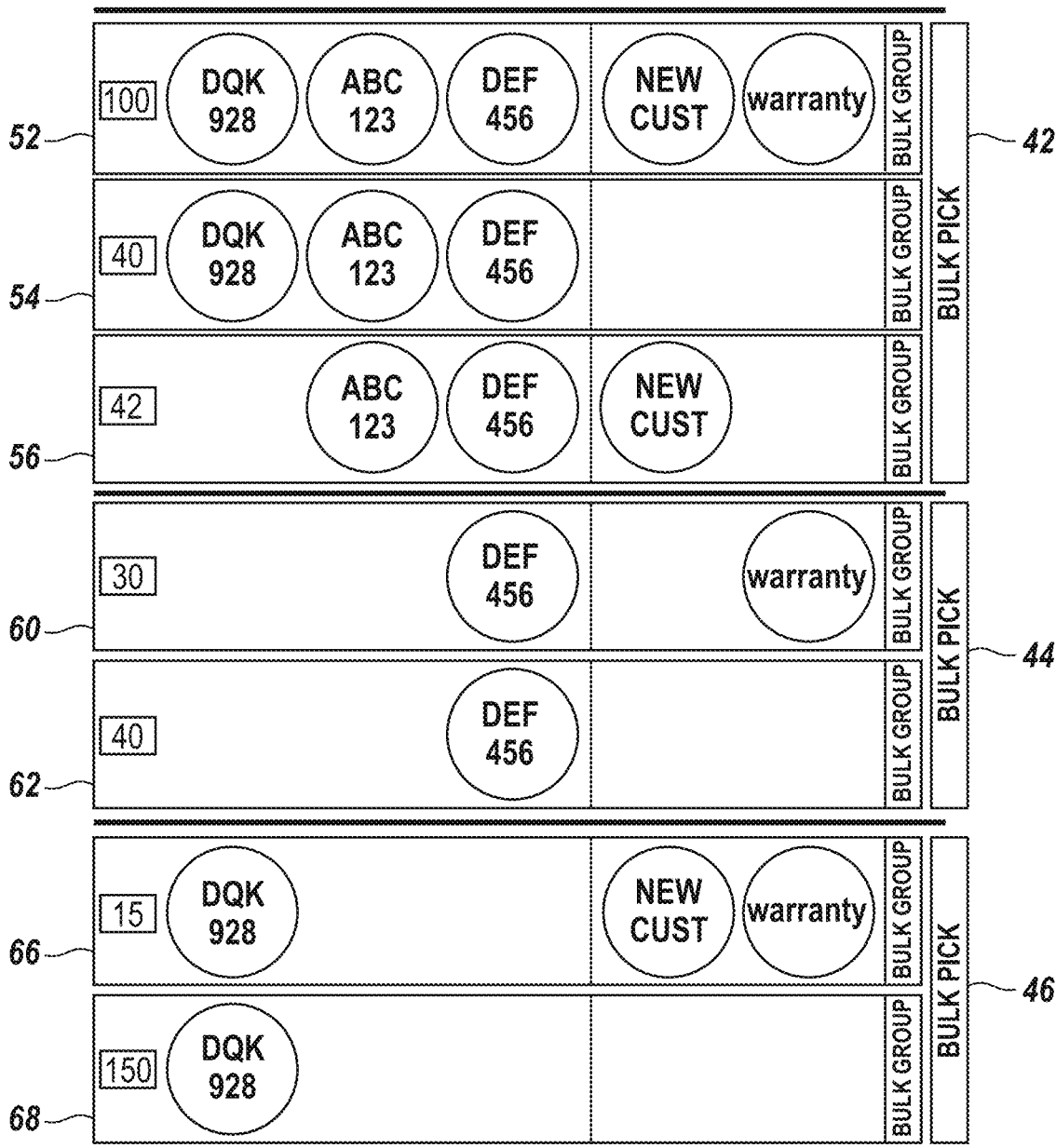
FIG. 4 is a depiction of the bulk picks and corresponding bulk pick recipes according to the teachings of the present invention.

The bulk pick order fulfillment unit 18 can also generate one or more bulk pick recipes from the data associated with the connected graph, step 32. As used herein, the term "recipe" or "bulk pick recipe" is intended to mean a collection of selected items from the customer orders and the additional items that are correlated or grouped together. As shown in FIG. 4, a user such as the supervisor can select various parameters or features 58 of the bulk pick in the bulk pick order fulfillment unit 18. For example, a user or the system 10 can define the maximum number of recipes per bulk pick, the maximum item count per bulk pick, and the minimum bulk group item count. Once the user has selected these parameters, the resulting calculated values for the bulk pick are presented including the total number of ingredients (i.e. items), the total number of recipes, and the total number of bulk picks that are generated. As shown, the bulk pick order fulfillment unit 18 generates and constructs bulk picks 42, 44, and 46, where each bulk pick comprises a selected number of bulk pick recipes or bulk groups. The bulk pick order fulfillment unit 18 can determine the bulk pick group or recipe sequence by determining the largest or smallest matching product or item count and then determining the largest or smallest number of inserts. The system can thus organize and aggregate the data in ascending or descending order relative to the number of items in the bulk pick. Those of ordinary skill in the art will readily recognize that the item data from the connected graph 26 can be organized in other ways as well. As illustrated, bulk pick 42 includes bulk pick recipes 52, 54 and 56; bulk pick 44 includes recipes 60 and 62; and bulk pick 46 includes recipes 66 and 68. Each of the above recipes includes one or more ingredients or items. For example, recipe 52 includes five ingredients, including items DQK928, ABC123, and DEF456, as well as the new customer insert NEW CUST and the warranty insert. Recipe 54 includes items DQK928, ABC123, and DEF456 with no additional inserts, and recipe 56 includes, for ingredients, items ABC123 and DEF456 and the new customer insert NEW CUST. Once the maximum number of recipes for each of the bulk picks is reached, the bulk pick order fulfillment unit 18 creates a further bulk pick. The bulk pick order fulfillment unit 18 can also generate less than the maximum number of bulk pick recipes, such as those associated with the bulk picks 44 and 46. The bulk pick order fulfillment unit 18 generates and organizes the bulk picks so that the most difficult recipes are collated first into the first bulk pick. For example, as shown in FIG. 4, the bulk pick 42 includes recipes 52, 54, 56 that are more complicated than the recipes in the other bulk picks 44 and 46.

When the bulk pick order fulfillment unit 18 generates one or more bulk pick recipes that include ingredients (or the recipe itself) outside of one or more of the predetermined parameters, the unit 18 does not generate a bulk pick employing these recipes. The bulk picks and corresponding bulk pick recipes can be utilized by the order fulfillment system 10, such as by the pick tour generating unit 20 or the automated fulfillment system 16 so that the ingredients within the recipe are selected either by pick agents via a mobile tour or by the automated fulfillment system 16. Further, the bulk pick order fulfillment unit 18 partitions or separates the bulk picks from each other according to the bulk pick group count parameter and the maximum item count per bulk pick parameter.

Figure 5:
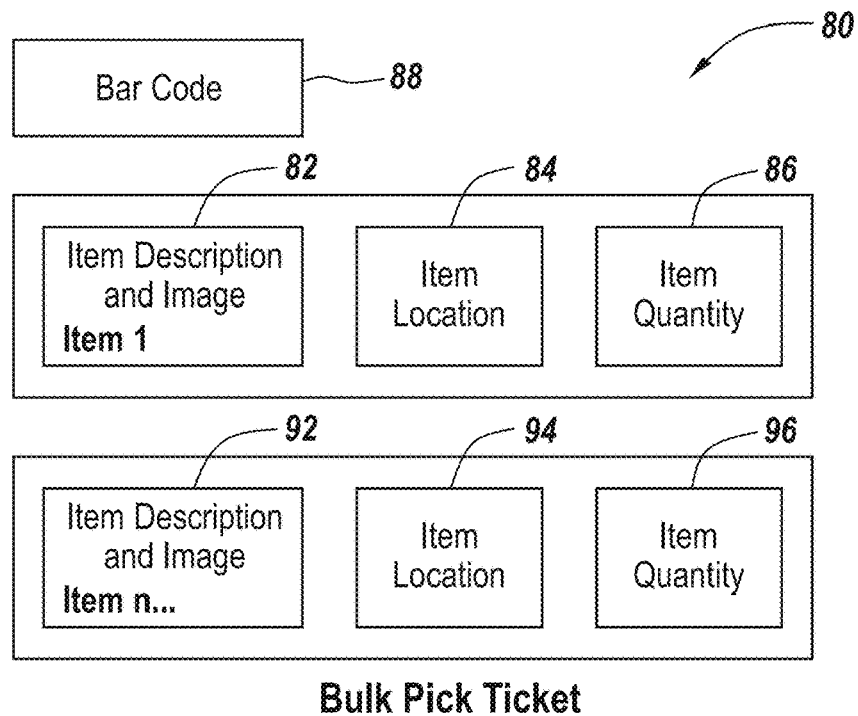
FIG. 5 is a schematic block diagram of a bulk pick ticket generated by the order fulfillment system of the present invention.

The bulk pick order fulfillment unit 18 then generates a bulk pick sheet or ticket that corresponds to each of the bulk picks 42, 44, 46, step 34. The bulk pick ticket is sent to either a mobile pick agent and/or to the automated fulfillment system 16 to retrieve the items, step 36. If the bulk pick ticket is sent to the automated system 16, processing hardware and corresponding software associated with the system 10 or the automated system 16 can perform the retrieval of the items based on the information contained within the bulk pick ticket. FIG. 5 is an example of a bulk pick ticket 80 generated by the bulk pick order fulfillment unit 18 according to the teachings of the present invention. The bulk pick ticket 80 can be printed by any suitable printing device associated with or coupled to the bulk pick order fulfillment unit 18 or the bulk pick ticket can be transmitted to other portions of the system 10 via processing hardware. The illustrated bulk pick ticket 80 can include any selected type and arrangement of information, and includes for example a description and image of one or more items, such as the illustrated Item 1 and Item n. The first listed item in the bulk pick ticket 80 is Item 1, and includes information such as the description and image of the item 82 to be picked from the warehouse, one or more locations of the item 84 in the warehouse, as well as the quantity of the item 86 to be picked. Similarly, Item n includes information such as the description and image of the item 92 to be picked from the warehouse, a location of the item 94 in the warehouse, as well as the quantity of the item 96 to be picked. The bulk pick order fulfillment unit 18 can print one or more of the bulk pick tickets 80 for use by the system and by, for example, a pick agent. A bar code 88 can also be associated with the bulk pick ticket 80 so that the pick agent and subsequent handlers of the items can determine the customer orders associated with the items via barcode scan.

The items identified by the bulk pick process of the bulk pick order fulfillment unit 18 and as set forth in the bulk pick ticket 80 can be picked according to the following process. One of ordinary skill in the art will readily recognize that the process can include additional steps or can omit one or more of the following steps without departing from the spirit and scope of the present invention.

Figure 6:
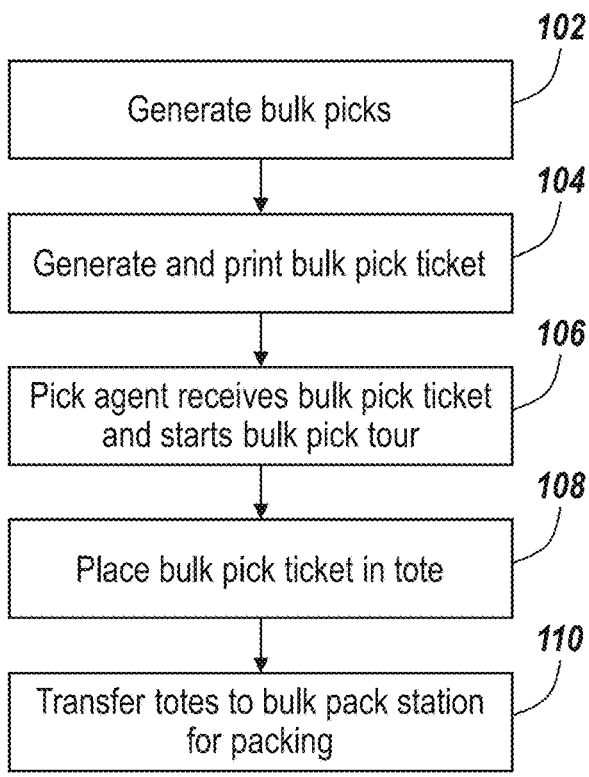
FIG. 6 is a schematic flow chart diagram illustrating the steps involved with generating a bulk pick ticket and associated bulk pick tour according to the teachings of the present invention.

As shown in FIGS. 1 and 6, the order fulfillment system 10 of the present invention collates and collects the customer order information with the order collection unit 12, and conveys this information to the order generating unit 14. The order generating unit 14 visually displays the order data through a display device to a warehouse supervisor, who sets or selects certain bulk wave parameters. For example, the system 10 can generate the tree map shown in FIG. 7 for use by the supervisor. The order generating unit 14 also receives other related information, such as additional customer information, order status information, and other system related information, from the database 24. The order generating unit 14 then transmits consolidated order fulfillment information to the bulk pick order fulfillment unit 18. The bulk pick order fulfillment unit 18 generates the bulk picks, step 102, as shown in FIG. 6, from the bulk pick recipes, which in turn are formed from the connected graph 26. The bulk pick and related customer order and item information is sent to a print device to print the bulk pick ticket 80, step 104. The bulk pick ticket 80 is received by a pick agent in the warehouse who creates or employs a bulk pick cart for temporarily storing the items associated with the bulk pick. The pick agent then starts a bulk pick tour, step 106. The pick agent moves along a path in the warehouse that is optionally optimized by the order fulfillment system 10 to retrieve or pick the items at selected locations. The selected items are then placed in selected compartments within each tote that is stored on the cart, or kept separated in containers or bags. The bulk pick ticket is then associated with one or more of the totes, step 108. Specifically, the bulk pick ticket can be placed on one of the totes, typically the tote on top when stacked, or is affixed to the cart in cases of very large bulk picks. The cart and associated totes are then moved to a selected area in the warehouse, and the totes are moved from the cart to a temporary holding station, and are then transferred by any suitable mechanism, including a conveyor belt system, to a bulk packing station, step 110. A bulk pack agent associated with the bulk pack station then scans the barcode on the bulk pick ticket 80 to determine if the recipes of the bulk pick are complete. If not, then the agent keeps assembling customer orders according to the bulk pick recipe until the recipe is complete. If more than one recipe is included in the bulk pick, then the next unfinished recipe is loaded for continued processing. The items are then packed and shipped to the customer according to known techniques.

The bulk picking of items in customer orders by the bulk pick order fulfillment unit 18 offers additional benefits and advantages. For example, a bulk pick is more efficient than a shipment pick performed by pick agents in situations where there are many customers that ordered the same set of items. This is because the pick agent only needs to visit a location once per item, and can pick multiple ones of the same item at the same time. Although the pick agent can employ a mobile cart for picking multiple single item shipments, or multiple multi-item shipments on a cart while performing non-bulk picks, a barcode scan is required on each item and tote compartment to perform an association to ensure item movement tracking accuracy. The bulk pick process can handle much larger quantities or items per pick, and does not require a barcode scan.

By way of example, consider a situation where one hundred customers ordered the same item. A pick agent can be directed to pick one hundred of the same item from a stock location and then take the entire group to a bulk processing station where the weight of the item and inserts is acquired once, customer invoices are printed, and then the agent assembles the individual shipments like stuffing envelopes. In addition to single item bulk picks, the system 10 supports multi-item picks and also takes into account any promotional, product oriented, or customer oriented inserts such that each of the recipes is unique. An example of a multi-item bulk pick is an ensemble scenario where one hundred customers ordered a ring, and fifty of those customers also ordered the matching bracelet, and another twenty five customers ordered just the bracelet. This would yield a bulk pick with two items: one hundred rings, and seventy five bracelets. This example bulk pick is then assembled into separate customer orders from a total of three recipes: fifty of just the ring, fifty of the ring and bracelet, and twenty-five of just the bracelet. In addition, customer oriented inserts yield more variations of these recipes, but ultimately there is a single pick of just two items that was able to fulfill all of these permutations.

The ability to pick single item shipments and multi-line shipments in parallel via bulk pick reduces the amount of distance and time that it takes to pick the customer shipments. An additional benefit of using the bulk pick process and system is being able to utilize less sophisticated machinery to perform the final packaging step of processing the shipment.

The illustrated pick tour generating unit 20 in FIGS. 1 and 8 is described in further detail herein, with reference for example to FIGS. 1-7 and with further reference to FIGS. 8-13. The order generating unit 14 of the order fulfillment system 10 interfaces or communicates with the pick tour generating unit 20, which receives the order fulfillment instructions 26 from the order generating unit 14. The pick tour generating unit 20 generates pick instructions for a single item or a multi-item order. The pick instructions can be forwarded to the automated fulfillment system 16 and/or to a pick tour mobile operator or agent for performing a pick tour.

As shown in FIGS. 1 and 8, the order generating unit 14 communicates with the pick tour generating unit 20 via output data signal 28. The order generating unit 14 organizes and collates customer orders into a set of shipments. The pick tour generating unit 20 forms part of the illustrated pick tour generating sub-system 29. A shipment consists of a unique shipment identifier and a set of location and quantity pairs. Further, a graph, map or other representation of the warehouse layout or footprint ("map") can be created and stored, such as for example in the warehouse map unit 120. The warehouse map can include indicia indicative of multiple rows of shelving, as well as indicia associated with the bays or vertical locations located along the rows of shelving. Other types of marking or location related information can also be used. The warehouse map unit 120 can be any selected storage element that is configured for storing warehouse map data. The warehouse map unit 120 can be a stand-alone storage element or can be integrated with one or more other system units, such as for example with the database 24 or the pick tour generating unit 20. For the sake of simplicity, the warehouse map unit 120 is illustrated as a separate unit. The warehouse map unit 120 can also store the locations in the warehouse where various items are stored, as well as the selected vertical bay at the warehouse location. The items correspond to one or more items that form part of the customer order.

The order fulfillment system 10 of the present invention employs a cart building unit 128 that stores, transmits and receives data associated with a mobile cart, and specifically includes a container or tote data for use by the pick agent as how to best arrange totes or containers on a mobile cart employed by the pick agent for a subsequent pick tour. The tote data can correspond to data associated with specific totes as well as to sub-compartments within the totes. The totes and associated sub-compartments are arranged and scheduled consistent with the pick orders sent to the pick agent. Similar to the warehouse map unit 120 and the graph generating unit 124, the cart building unit 128 can be a separate element or can form part of the pick tour generating unit 20. The totes on the mobile cart can be uniquely identified by identification (ID) information, which can include any type of suitable data, including for example alphanumeric data. The ID information can be encoded in a barcode that can be placed on the front or back of the tote that is scanned while on a cart or on a suitable transport system (e.g., a conveyor belt) within the warehouse. The tote can include one or more sub-compartments, such as for example four sub-compartments or quadrants. In addition to the barcodes on the exterior of the tote, each sub-compartment of the tote can also include unique identification information, such as a barcode. The ID information associated with each sub-compartment is used and scanned by the pick agent. The sub-compartments can house one or more selected items associated with a shipment. The ID information can be exchanged with the cart building unit 128 and/or with the pick tour generating unit 20.

The pick tour generating unit 20 can for example perform a mapping between the customer orders or shipments and warehouse locations in the form of a map, such as a shipment-bay graph. This mapping or graphing can be performed by the graph generating unit 124. The graph generating unit 124 can be a separate element or can form part of the pick tour generating unit 20. The graphing can be performed in a manner so as to optimize the time and distance that a pick agent needs to travel when picking or selecting certain items. The items correspond to one or more portions of one or more customer orders. The graphing can also be optimized so as to avoid potential collisions between pick agents and to consider the location of any selected transport system, such as conveyor belts, so as to ensure that the pick agent has relatively easy and speedy access to the transport system. The graph generating unit 124 also generates the graph employing shipments or customer orders that include more than one item located at more than one location.

The illustrated graph generating unit 124 can employ a value sorted tree map technique when generating the map or graph. An example of the value sorted tree map 130 is shown for example in FIGS. 9A and 9B. Specifically, FIG. 9B illustrates that the value sorted tree map 130 is an associative array data type that enables high-speed graph modification while concomitantly maintaining value sort order. The associative array data type, also known as a map, comprises a collection of keys, including (key, value) pairs, such that a value can be quickly retrieved by the key, without necessitating an ordering of the set of values that the keys are mapped to. When employing the value ordered tree map 130, the ordering of the values are retained during access, insertions, and deletions, thus allowing for optimization of graph traversal because the values do not need to be re-sorted before use or after modification.

An example of the value sorted tree map 130 compared to traditional mapping techniques is shown in FIGS. 9A and 9B. FIG. 9A shows a map 132 with a list of items having associated identifications, such as L101, L102, L103, and L104. The items are mapped to graph nodes A, B, C, and D, which can according to one practice correspond to warehouse locations. The traditional map implementation does not guarantee the order in which the values associated with the items illustrated in the map 132 are retrieved by the pick agent. Before deciding which graph node is the next in the sequence to be processed, the map values have to be sorted again. For example, the values for the A node are L102, L101, and L103, which needs to be sorted into L101, L102 and L103 before selecting the next node in the sequence. The sorting functionality is also required when processing the other map nodes B, C, and D. The continuous need for re-sorting introduces significant overhead when processing large graphs in both computation times for the sort, as well as the physical computing resources required, such as processing capabilities and memory.

The value sorted tree map 130 of the present invention ensures that the values or node links remain in a sorted order during access, insertion, and deletion which removes the need to sort all of the value nodes when deciding which node to process next in the graph. For example, as shown in FIG. 9B, the items are presorted and listed as L101, L102, L103, and L104, and then mapped to the graph nodes A, B, C and D. When the value L101 is removed for example from the value sorted map for node A, then the new first value becomes L102, without the need to re-sort the values of the map. The value sorted map technique of the present invention is highly beneficial for graph processing algorithms that alter the graph by removing nodes during graph traversal. As such, the present sorting technique significantly reduces the amount of processing overhead and memory needed while processing the graph. By maintaining the high speed key to value lookup characteristics of a map, and automatically implementing and maintaining sort order on modification, the value sorted tree map provides a very efficient technique for optimizing graph processing. Further, shipments of customer orders that have more than one location pick are placed in the graph. The orders that have a single item or location can be handled separately.

When creating the value sorted tree map 130, the incoming customer orders or shipments are analyzed by the order generating unit 14 to determine if the order is to be handled by the automated shipment system 16, by the pick agent as part of a pick tour plan or a pick tour, or a combination of both. When the order fulfillment system 10 with the assistance of the supervisor determines that the order or part of the order is to be handled by the pick agent, the pick tour generating unit 20 determines if the order includes items located at multiple different locations in the warehouse. The system can easily determine the warehouse bay from the warehouse location as set forth in the warehouse map 120. If the bay node exists, then the quantity of the pick from the bay can be incremented. If the shipment node does not already exist in the map, the pick tour generating unit 20 creates a new graph or bay node in the map. The system then adds a link from the shipment node to the bay node in the graph and the pick tour generating unit 20 tracks the quantity of the shipment in the bay/node structure. The resultant graph or map is then value sorted by the first bay location and/or bay count, and then the subsequent bay location. The map is then sorted by location. The graph is processed in such a manner that optimizes the assignment of orders into an N number of the sub-compartments or the compartments of the mobile cart. Further, the order fulfillment system 10, such as through the pick tour generating unit 20 and/or the graph generating unit 124, analyzes the customer order and shipment information and inserts the shipment data into the graph and creates a new graph node for the shipment if the bay node does not exist. For each item of the shipment determine a corresponding warehouse location, and then determine a warehouse bay from the location. The system then adds a link in the graph between the bay node and the shipment node. The shipment graph is then value sorted by the first bay location, bay count, and then subsequent bay location.

The pick tour generating unit 20 then constructs a pick tour plan or a pick tour having pick instructions associated therewith. The pick tour plan and the pick tour essentially provide a schedule or list of tasks for the pick agent to follow. The pick tour plan is constructed or generated by the pick tour generating unit 20 so as to optimize the path distance through the warehouse as well as the number of pick tasks that a pick agent can execute when eventually performing the pick tour. Factors that the pick tour generating unit 20 considers when optimizing or constructing the pick tour plan can include but are not limited to avoiding impediments or obstacles within the warehouse, such as for example walls and machinery, preferred human walking paths, opportunistic drop-off points like the central conveyor belt and location stock density as well as travel distance and quantities of products picked. Permissions required of the pick agent are also considered as picking expensive items, oversized items, or fragile items may require different levels of authorization or skill sets to perform. For example, a new pick agent may not have permission to execute a tour that contains important or expensive items.

Further, the cart building unit 128 employs the pick tour plan to help construct the pick cart by determining the number of totes and sub-compartments, and associating therewith the appropriate identification information. The pick tour plans are preferably constructed or generated so as to include trips by the pick agents to generally the same number of bays as well as the same number of picks or items, while concomitantly minimizing the overall or total walking distance by the pick agent. The pick plans are constructed by mapping the shipments or customer orders collected by the order generating unit 14 with the warehouse configuration data stored in the warehouse map unit 120 by the graph generating unit 124. The shipments that include more than one location pick are placed in the graph. The shipments that are directed to a single piece or warehouse location can be later added to the below pick tour. The pick plan includes a list or set of pick tasks that are segmented or partitioned into selected warehouse locations, thus creating different pick tasks for each warehouse zone.

Figure 12:
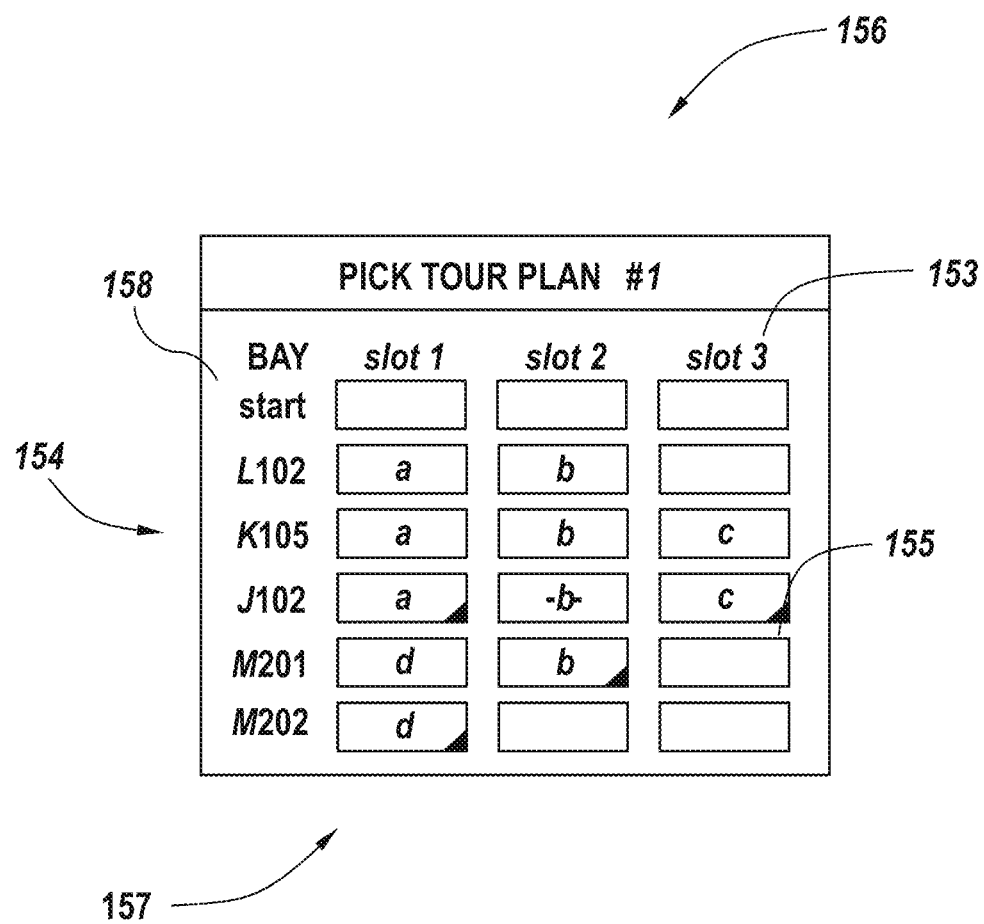
FIG. 12 is a schematic representation of a pick tour plan generated by the pick tour generating unit of the order fulfillment system of the present invention.

As shown in FIG. 12, a pick tour plan 156 can be created by the pick tour generating unit 20 and includes the illustrated pick instructions 157. According to one practice, the pick tour plan 156 can be optionally employed by the pick agent to retrieve or pick the items set forth in the pick instructions. Alternatively, the pick tour plan 156 can be converted into the pick tour 174 for use by the pick agent. By way of illustrative example, the illustrated pick tour plan 156 has been generated by the pick tour generating unit 20 and includes pick instructions 157 directed to four different customer shipments, which are labeled as 'a', 'b', 'c' and 'd'. By way of illustration, an exemplary mobile cart can be configured by the cart building unit 128 to use only three reusable slots 153 of the various slots on the cart. The slots 153 can be designated as slot1, slot2, and slot3, and form part of the pick instructions 157. When a customer shipment has been fully assembled, as depicted by suitable completion indicia, such as darkened triangles 155 in the bottom corner of the pick tour plan 156, the customer shipment is placed in a bag by the pick agent and labeled with a barcode so that the same slot may then be used to assemble a different customer shipment. In the example configuration of FIG. 12, the initial state of the pick tour plan is the start state 158 where each of the three slots 153 on the mobile cart is indicated as being empty. The warehouse map stored in the warehouse map unit 120 can include a number of bay locations 154 in the map. The pick tour plan 156 essentially sets forth a series of bay locations in the warehouse that the pick agent is instructed to visit to retrieve selected items located at the bay locations and that correspond to various customer orders. The bay locations 154 can include for example a first bay location in the warehouse that forms part of the pick tour plan 156, which can have any suitable designation, such as for example L102, as illustrated. As such, the pick agent is instructed by a mobile device user interface to pick a selected item for customer shipment 'a' into slot1 and the same item into slot2 for shipment 'b'. No pick was planned for slot3 at bay location L102, thus slot3 remains empty. The pick agent is then directed by the mobile device user interface to walk to the next bay location K105. Additional items are picked from this location for shipments 'a' and 'b', and which are placed in slot1 and slot2, respectively, and customer shipment 'c' is started by placing the item in the formerly empty slot3. The pick agent is then directed by the mobile device user interface to walk to the next bay location J102. Items are picked for shipment 'a' in slot1 and shipment 'c' in slot3, however, shipment 'b' does not have any picks at location J102. However, the previously picked items continue to occupy slot2 because not all items for customer shipment 'b' have been picked. The customer shipments "a" and "c" are completed, as indicated by the completion indicia 155, and hence these items are bagged by the pick agent and labeled with the shipment number and then placed in a bin of completed shipments on the cart or directly on conveyance equipment such as a central conveyor belt destined for the packaging operation. Because customer shipments 'a' and 'c' are now complete, the respective slots slot1 and slot3 are now eligible to be used to assemble a different shipment. The pick agent is then directed by the mobile device user interface to walk to the next bay location M201. The pick agent is directed to pick items for customer shipment 'd', which is placed in slot1, as well as for customer shipment 'b', which is in slot2. The last item for customer shipment 'b' is picked, as indicated by the completion indicia 155. Slot3 remains empty because shipment 'c' has already been completed and taken out of the slot on the previous bay visit. The pick agent is then directed by the mobile device user interface to walk to the last bay location M202, where the agent picks the last item for shipment 'd' from this location and the pick tour plan is complete with all four shipments 'a', 'b', 'c', and 'd' having been picked and assembled on the mobile cart and now destined for the packing operation.

When compartmentalized totes on the mobile cart are used, the slots 153 represent sub-compartments of the totes and are typically not re-used because the tote itself is used as the container of the product instead of a bag. Once all picks for all sub-compartments of the tote have been completed, the tote is then transported by automated conveyance or by moving the mobile cart to a destination for unloading the totes for further processing.

As shown in FIGS. 8 and 13, the pick tour generating unit 20 can preferably convert the pick tour plan 156 into the pick tour 174 having pick instructions associated therewith that are conveyed to the mobile device of the pick agent. As such, the pick tour plan 156 can be directly converted to the pick tour 174 prior to be being sent to the pick agent. The pick tour 174 can be, if desired, tours that are confined to selected zones or regions of the warehouse. As such, the location of the pick agent is considered when assigning a pick tour to a selected pick agent. The pick tour 174 includes pick instructions that are, in essence, an ordered list of tasks to perform, which includes the location, quantity, and specific items to pick as well as the mobile cart slot number to place the picked items into for subsequent shipment. The pick tour instructions leverage the similarity in customer orders and item locations within the warehouse so as to minimize the amount of time it takes to pick the one or more items that comprise the customer order. The pick tour includes a path that is optimized for time and distance for the pick agent. The path can have any selected configuration, and is typically a serpentine path. The mobile handheld device guides the pick agent to the selected location of the item in the warehouse and assists the pick agent in selecting the correct item. The handheld device also serves to allow the order fulfillment system 10 to track and verify the location of the pick agent, and to perform product and location verification in real time. The interface on the handheld device presents a visual interface that guides the pick agent through a pick tour walking path in the warehouse while concomitantly assembling multiple customer shipments on a mobile cart in parallel. As noted above, the mobile cart has a series of totes, and each tote can have one or more sub-compartments. The pick tour generating unit 20 optimizes the use of the totes and associated sub-compartments to sequence the assembly of multiple multi-line orders. The pick tour generally is confined to a selected duration so that multiple sequential pick tours can be performed by a pick agent. The duration of the pick tours can be between about 30 minutes and about 90 minutes, and preferably are about 45 minutes.

FIG. 13 shows for the purposes of simplicity and illustration an exemplary pick tour 174 that was generated from the pick tour plan 156. The pick tour 174 is similar to the pick tour plan 156 with additional detailed information where specific item locations, product IDs, and quantities are specified. Unlike the pick tour plan which focused on creating multiple optimal plans, the pick tour 174 focuses on having all of the information necessary to execute the pick or retrieval of the product by the pick agent. The sequence 174A is the order in which each of the pick tasks should be performed. The location 174B is the exact bin number at the bay location and also the bar-coded value that is placed on the bin. The shipment information 174C is the unique shipment ID that represents a customer order or grouping of customer orders for the same shipping destination address. The product ID 174D and quantity (QTY) 174E of the product to be picked from the location 174B is used to verify that the correct product and number of products is being picked. The slot information 174F is the destination of the picked item on the mobile pick cart which may be a re-usable bin or the sub-compartment of a tote. The closed flag or indicator 174G indicates if all of the items for the shipment have been picked upon the completion of the pick task. In the exemplary pick tour 174, shipments 2 and 3 174C correspond to piece picks where a customer only ordered a single product and only one quantity of that product, thus they do not need to be assembled with other products and are not placed in a slot, but instead are directly placed in a bag with an affixed printed adhesive barcode to identify the shipment in the bag. Once the pick agent has completed all of the pick tasks in a pick tour 174, the pick tour is complete and the pick agent may request a new pick tour. The pick tour assignment is based on the location of the pick agent in the warehouse relative to the first picking location for available pick tours. In some cases, the product stock may be segregated where special permissions may be required, such as for example when picking high end, fragile, oversized, or otherwise categorized products or items. The identity of the pick agent, the location of the pick agent, the permissions of the agent, and the priority of the pick tour are factors that the pick tour assignment algorithm uses in assigning pick tours to pick agents.

Once the pick tour plan 156 is generated and transmitted to the mobile device of the pick agent, the pick tour 174 can be created and started by the pick agent. According to the present invention, the pick tour 174 includes shipments or orders that correspond to items at multiple locations in the warehouse. The pick tour generating unit 20 can add a task to an existing pick tour that corresponds to an item located in a convenient or "opportunistic" location along the existing pre-defined pick tour path of the pick agent. The pick tour generating unit 20 can sort the additional individual piece pick tasks by location and then compares the piece pick tasks to the current pick tours or the pick tours as of yet to be assigned. The additional piece pick task typically includes one or more items disposed at a single location that is opportunistically located along the walking path of existing pick tour. The opportunistic piece pick task added to a pre-existing pick tour is a pick task that meets selected heuristic calculations regarding the closeness of the location of the item to the pick agent, the remaining pick cart capacity, the additional time added to the existing pick tour, and overall collision or contention reduction with other piece pick tours. Other factors can include whether the pick agent has already visited the warehouse location as part of the current pick tour, and whether the item location is along or sufficiently near the path of the current pick tour. The closeness of the piece pick location can be calculated in terms of time and/or distance to the current pick agent and current pick tour path, and the pick tour generating unit 20 can define an overall maximum distance or time to be added to the current pick tour in order to add one or more selected piece pick tasks to the tour. Thus, the pick tour generating unit 20 contemplates adding one or more additional piece pick tasks to the tour provided that the maximum or overall distance and time added to the pick tour is at or below the maximum amounts.

Figure 10:
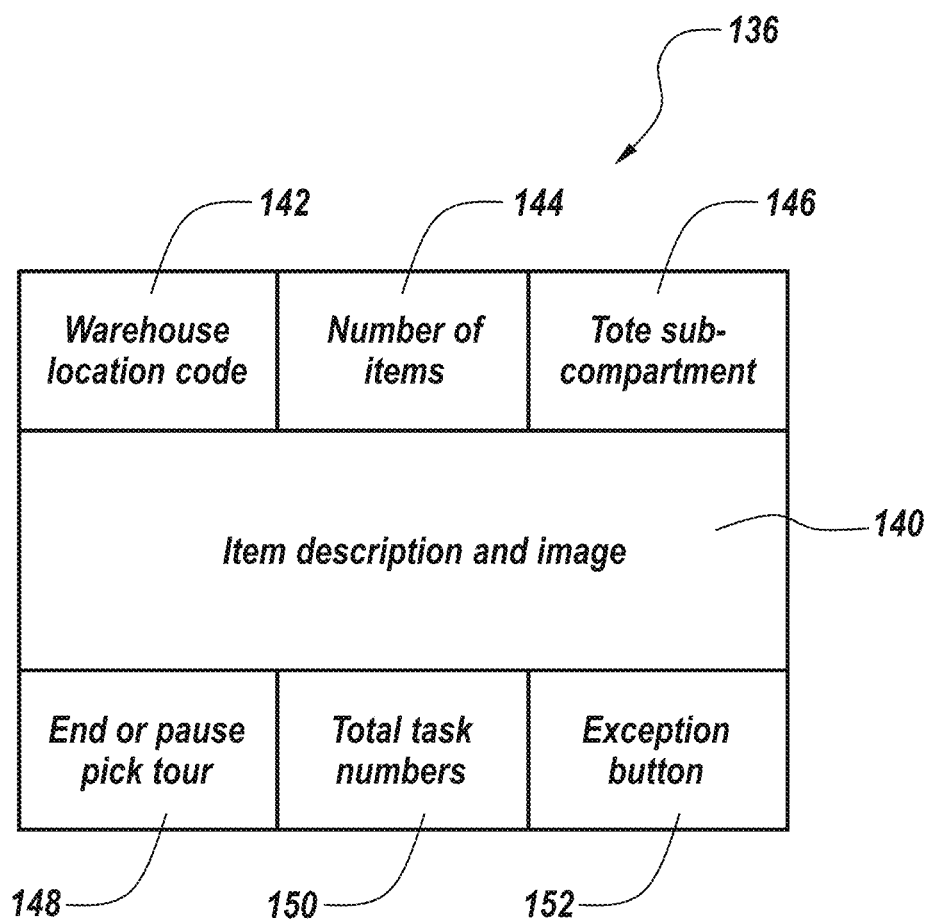
FIG. 10 is a schematic representation of the display of a handheld device employed by the pick agents during a pick tour according to the teachings of the present invention.

FIG. 10 illustrates an exemplary interface or display 136 of the mobile handheld device employed by the pick agent. The device has associated therewith suitable hardware, such as a scanner, processing hardware, memory and the like (not shown). The device has a display 136 that can be configured in any selected manner. As shown, the display 136 has a series of dedicated regions or areas that display selected types of information. For example, the display has a top area or region that has sub-regions 142, 144, 146, a central area or region 140, and a bottom area or region that has sub-regions 148, 150, and 152. The top sub-region 142 can set forth the warehouse location and bay of the item to be retrieved. The warehouse location and bay can have identification information associated therewith, such as a barcode. The handheld device can scan the barcode of the location, and if the location matches the location displayed in sub-region 142, a visual or audible alert can be provided. In the event that the location does not match, an alternate visual or audible alert can be provided that indicates an error. For example, the sub-region can change color to visually indicate that a match exists. Conversely, the handheld device can produce an audible sound or generate a tactile sensation. The handheld device can then be used to scan a barcode attached to the item to verify that the correct item is being picked. The item to be picked can be displayed in the central region 140 along, if desired, a barcode number. The pick agent can thus perform a secondary visual check to ensure that the picked item visually matches the item displayed in the region 140. This provides redundancy in the system to ensure that the pick agent is selecting or picking the correct item and can identify situations where an item may have the incorrect tag or barcode. The pick agent can touch the region 140 to display more detailed information about the picked product, such as product SKU, product description, and other associated information that could be used to identify the item in the case that a product image is not available or more information about the product is needed. Next, the pick agent scans the target tote compartment where the product is to be placed, as shown in sub-compartment 146. The pick agent can also visually determine and confirm the number of items to be picked from the warehouse compartment, as indicated in sub-region 144. Any one of or all of the sub-regions 142, 144, 146 can change color to visually indicate a match between the ordered item and the product retrieved from the warehouse bay. When completed, the pick agent travels to the next warehouse location provided in the pick tour.

The display 136 also includes a bottom region that includes a sub-region 148 that allows the pick agent to pause or cancel the pick tour, a display sub-region showing the number of tasks completed and the number of total tasks (sub-region 150), as well as a display sub-region that allows exception information to be entered or can be used as a visual indicator of the network connection status (sub-region 152).

Once the last item for a shipment is picked and placed in a slot or sub-compartment of the tote, the pick agent is instructed that the sub-compartment is now closed and the shipment has been fully assembled. This information can be conveyed to the pick agent through the mobile handheld device. The completed totes may then be taken off of the mobile cart and placed on a central conveyor belt or otherwise delivered to the next step in the packing and shipping process. Alternatively, the contents of the sub-compartment are then placed in shipping bags by the pick agent, and then the bags and/or the tote(s) are then placed on a central conveyor belt and are sent to the packing and shipping subsystem 22.

Figure 11:
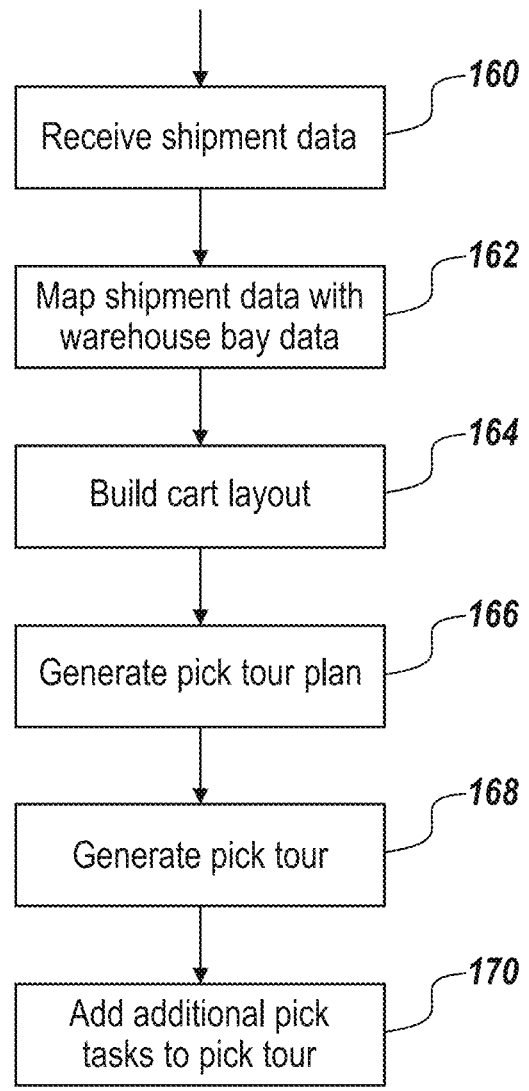
FIG. 11 is a schematic flow chart diagram illustrating the steps involved with generating a pick tour plan and associated pick tour according to the teachings of the present invention.

FIG. 11 is a flowchart depiction of the pick tour generation process performed by the order fulfillment system 10 according to the teachings of the present invention. The system 10 receives customer order information from the customer and the order information is collated by the order collection unit 12. The order collection unit 12 then conveys this information to the order generation unit 14. The customer order information is combined with the customer shipment or address information either provided by the client for first time customers or the information is retrieved from the database 24, step 160. The graph generating unit 124 maps the shipment data with the warehouse map data stored in the warehouse map unit 120 to generate a shipment-bay graph or connected map, step 162. The map is value sorted to create a value sorted tree map. The cart building unit 128 then provides the pick tour generating unit 20 with cart specific information or data, including identification information of the containers or totes on the mobile cart, as well as identification information for any sub-compartments within each container or tote, step 164.

Once this information is determined, the pick tour generator 20 initially generates a pick tour plan 156, step 166. The pick tour plan 156 is constructed or generated so as to optimize the path distance through the warehouse as well as the number of pick tasks that a pick agent can execute when eventually performing the pick tour. The pick tour plan 156 includes location information of the customer items, including warehouse location and corresponding bay, as well as container and sub-compartment information of the mobile cart. The pick tour plan is then converted into a pick tour 174 by the pick tour generator 20, step 168. The pick tour 174 can include any information required by the pick our agent to conduct the pick tour, including the location information of the items to be picked, identification information of the items, and the quantity of the items to be picked. During the pick tour, the pick tour generator 20 can add a pick task to the current pick tour of the agent if the agent is located in a selected proximity to the item, step 170. This opportunistic piece pick enables orders to be processed by the order fulfillment system 10 as expeditiously as possible.

As shown in FIGS. 14-17, the automated fulfillment system or sub-system 16 of the present invention can be any commercially available product picking or fulfillment system, such as those manufactured by SSI Schaefer of Germany. The automated fulfillment system 16 can include a series of vertically and horizontally extending stacks or carousels 220, each of which can include a plurality of spatially separated shelves or racks (not shown). The totes or tubs 222 from the system 10 can be conveyed to the carousels 220 via a transport system, such as the illustrated conveyor system 226. The conveyor system 226 can include a series of mechanical connections that allow one or more tubs 222 to travel both horizontally between rows of shelves as well as vertically among the shelves. The stacks or carousels 220 thus function as automated racks of tubs that can retrieve a specific storage item and deliver it to the conveyor system 226. The conveyor system can be coupled to the shelves so that the tubs containing the items can be transported within as well as to and from the automated fulfillment system 16. Mechanical arms (not shown) place items from the shelves into the tubs 222 and when a customer order is complete, the tubs 222 are conveyed via the conveyor system 226 to a pick station 230. At the pick station 230, the items of the customer order are removed from the tubs 222 and then placed in pick totes 228. The tubs 222 are then returned to the carousels 220. The system can be controlled by known hardware and software, and employs a control station to control the movement of the bins throughout. The control station can form part of the bulk pick order fulfillment unit 18 and/or the pick tour generating unit 20, or can be a separate control station that communicates with these as well as other units.

Figure 14:
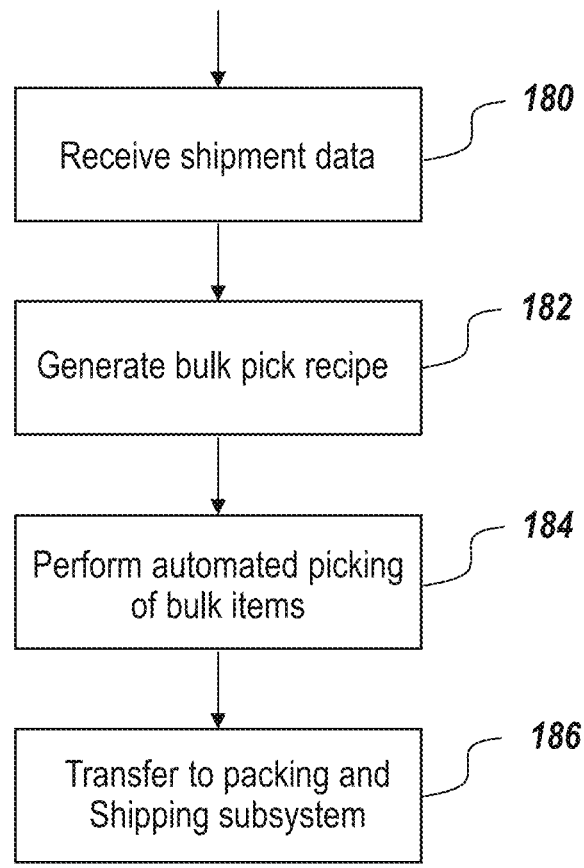
FIG. 14 is a schematic flow chart diagram illustrating the steps involved with picking items from a customer order via a bulk pick recipe by employing the automated fulfillment system according to the teachings of the present invention.

Similar to the above in connection with the bulk pick order fulfillment unit 18, and as shown in FIG. 14, the order fulfillment system 10 receives shipment and item data, step 180, from the customer orders. The customer order collection unit 12 generates customer and order information that is transmitted and received by the order generating unit 14. The order collection unit 12 consolidates the incoming customer orders and organizes and consolidates selected order and customer information from the customer orders. The order generating unit 14 is configured for controlling and managing the order data for fulfillment in a time based manner. The order data is preferably organized and managed by the order generating unit 14 so as to optimize the selection or picking of the items in the customer order and then shipping the items to the customer. The order generating unit 14 then transmits the order fulfillment instructions or data to a bulk pick order fulfillment unit 18 to generate a bulk pick recipe, step 182.

The automated fulfillment system 16 can receive bulk pick instructions from the bulk pick order fulfillment unit 18 and perform an automated picking of items to fulfill a customer order, step 184. As described above, the order generating unit 14 can be configured to group together a set of customer orders that share similar features into a larger bulk pick order, and then the bulk pick order data can be transmitted to the bulk pick order fulfillment unit 18. The bulk pick orders (e.g., a bulk order wave) are groupings of customer orders that may be picked or fulfilled in a warehouse in aggregate. The bulk pick orders are selected to optimize the fulfillment process by selecting orders that have certain features in common. The bulk pick order fulfillment unit 18 generates bulk pick tour data corresponding to one or more bulk pick tours that can be fulfilled by the automated fulfillment system 16.

The automated fulfillment system 16 can pick the selected bulk pick items and then place them in one or more totes or container elements. The totes are then conveyed by the conveyor system to the packing and shipping subsystem, step 186.

For items within the customer order that are not located in the automated fulfillment system 16, the system 10 via the bulk pick order fulfillment unit 18 can generate a bulk pick recipe and a bulk pick sheet for dissemination to a pick agent, as described above.

Figure 15:
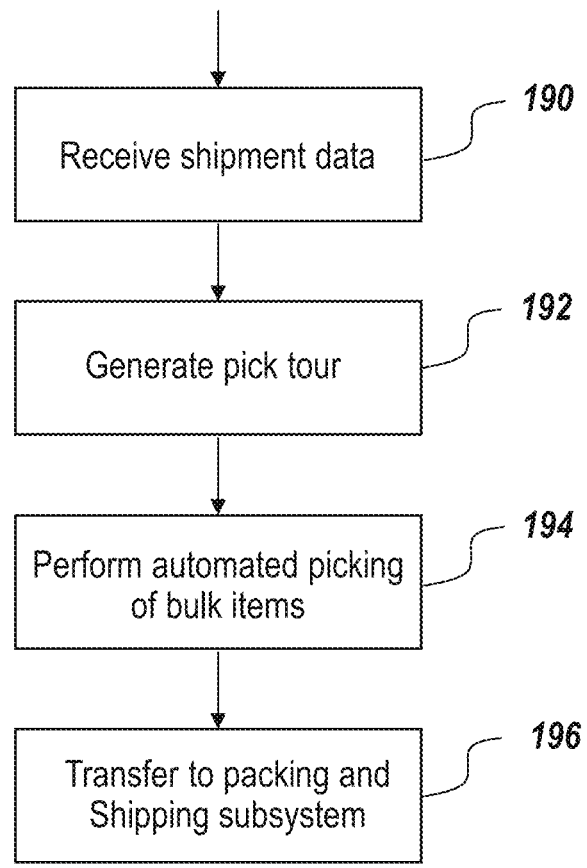
FIG. 15 is a schematic flow chart diagram illustrating the steps involved with picking items from a customer order via a pick tour by employing the automated fulfillment system according to the teachings of the present invention.

With reference to FIG. 15, the order fulfillment system 10 can generate and send instructions to the automated fulfillment system 16 to perform non-bulk picks. For example, the pick tour generating sub-system 29 receives information from the order generating unit 14 regarding the customer order information, step 190. The pick tour generating unit 20 then performs a mapping between the customer orders or shipments and warehouse locations in the form of a map, such as a shipment-bay graph, via the graph generating unit 124 and the warehouse map unit 120. The pick tour generating unit 20 then generates pick instructions and constructs a pick tour plan and/or schedule for the pick agent, the automated fulfillment system 16, or both. The pick tour plan 156 is constructed or generated so as to optimize the path distance through the automated system as well as the number of pick tasks that a pick agent can execute when eventually performing the pick tour. The pick tour generating unit 20 then converts the pick plans into pick tours 174, step 192, that are conveyed to the mobile devices of the pick agent, to the automated fulfillment system 16, or to both. The pick tour 174 is an ordered list of tasks to perform, which includes the location, quantity, and specific items to be picked.

The automated fulfillment system 16 then picks the selected items listed in the pick tour 174 and the places the items in one or more tubs, totes or containers, step 194. The tubs or totes are then conveyed by the conveyor system to the packing and shipping subsystem, step 196.

For items within the customer order that are not located in the automated fulfillment system 16, the system 10 via the pick tour generating unit 20 can generate a pick tour plan 156 or a pick tour 174 for dissemination to a pick agent, as described above.

Figure 16:
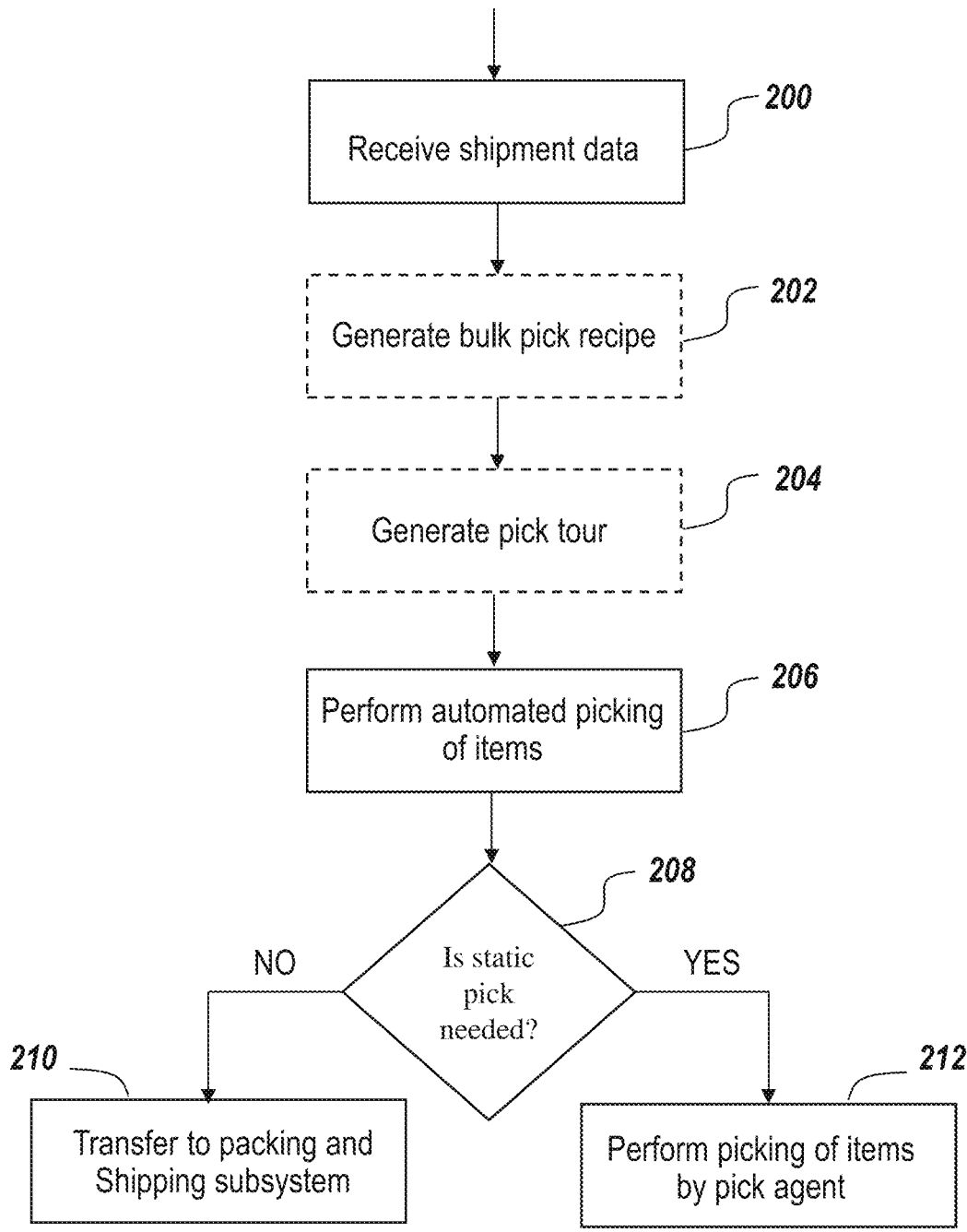
FIG. 16 is a schematic flow chart diagram illustrating the steps involved with picking items from a customer order via a bulk pick recipe and/or a pick tour by employing the automated fulfillment system as well as a pick agent according to the teachings of the present invention.

Further, the order fulfillment system 10 allows for one or more items picked through either the bulk wave process or the pick tour process to be added to items picked by the automated fulfillment system 16 prior to transfer to the packing and shipping subsystem 22. This enables the system 10 to be able to add one or more items not located in the automated fulfillment system to be added to an order that is primarily filled by the automated fulfillment system. For example, as shown in FIG. 16, the customer order collection unit 12 generates customer and order information that is transmitted and received by the order generating unit 14. The order generating unit 14 controls and manages the order data for fulfillment in a time based manner, step 200. The order generating unit 14 then transmits the order fulfillment instructions or data optionally or alternatively to either or both the bulk pick order fulfillment unit 18 to generate a bulk pick recipe, step 202, or to the pick tour generating unit 20, step 204, for generating a pick tour. The steps 202 and 204 are shown in phantom to represent that either or both are optional steps. The order fulfillment system 10 then transfers either or both the bulk pick recipe or the pick tour plan 156 to the automated fulfillment system 16 to automatically pick or retrieve the selected customer items, step 206. Once the automated system selects one or more of the customer items, the system determines whether an item in the bulk tour or the pick tour is located in the warehouse and not in the automated fulfillment system. Specifically, the order fulfillment system 10 determines if a static pick is needed, step 208. If a static pick is not needed, and hence all of the customer items are found within the automated fulfillment system 16 and are retrieved, then the system transfers or conveys the items to the packing and shipping subsystem 22, step 210. However, if one or more items are located outside of the automated fulfillment system and hence one or more static picks are needed, then the system 10 generates either a bulk tour recipe or a pick tour that is conveyed to the handheld device of the pick agent. The pick agent retrieves the selected one or more customer items from the bays in the shelving in the warehouse, step 212. The items are eventually combined with the items picked by the automated fulfillment system. When there are no additional items required to be picked, the items are conveyed or transferred to the packing and shipping subsystem 22.

The present invention can also include a system and method for handling customer returns and/or replenishing items in the warehouse. For the sake of simplicity, we reference herein the processing of items returned by a customer, and the placement of the returned items in the warehouse, as also encompassing the replenishment of items in the warehouse. One of ordinary skill in the art will readily recognize that the building of the totes and mobile carts, and the put away or return tours (similar to the pick tours) are equally applicable to replenishing or adding items to the warehouse floor. As shown in FIG. 18, the order fulfillment system 10 of the present invention can also include a return order generating unit 240. The return order generating unit 240 can create or generate, in essence, a reverse pick tour, that is, a tour that guides the pick or return agent through the warehouse to return selected items to selected locations rather than retrieve items. The return tour can be generated to optimize the return time and return trip of the return agent, similar to the generation of the pick tour. The processing of customer returns can be handled in the same facility as the fulfillment of customer orders or in an adjacent or separate facility.

The returned items from the customers that form part of the customer order can be processed according to known techniques. According to one practice, the order fulfillment system 10 retrieves information associated with the returned orders that enables the returned items to be properly processed and credited to the associated customer account. The customer related information as well as order related information can be stored for example in the database 24. The information retrieved from the returned items can include customer information retrieved directly from the returned packaging or invoice, including customer identification information, including customer identification data, name data, and address data. If this information is lacking, or additionally, the information can be retrieved from the customer order number, the shipment number or associated identification information (e.g., postal or shipping service identification information), the product or item identification information, and the like.

The order fulfillment system 10 or the return agents assigned to inspect or review the returned items initially assess the returnability of the items. For example, the system 10 or the return agents inspect the items for damage or wear and tear on the items in order to determine if the items can be accepted for return. The system or the return agent also reviews the order information, including item identification data, quantity, and the like, to determine if any customization to the product occurred, such as sizing. The order fulfillment system 10 or the return agent also verifies if the returned items are being returned within the return time period and whether a warranty covers the returned items. Alternatively, if the items are still in the original packing with an associated barcode, the barcode can be scanned by any suitable scanning device, such as by the handheld device employed by the pick agents, as well as by other agents.

The items to be returned to the warehouse, which includes the warehouse bays as well as the automated fulfillment system 16, are eventually assigned to a sub-compartment of a tote on a return cart. Prior to constructing the return cart, the items to be returned can be placed within selected compartments of a return tote and when filled, placed on a conveyer system to be transferred to a return tote area or region. Once a return cart is created, the return order generating sub-system 241 determines the specific destination in the warehouse of the returned items. Specifically, the illustrated system 10 determines the location of the returned items based on the location of similar or identical items presently located in the warehouse, or where the items are most efficiently picked when sold again. To determine a proper item location or return tour path of the return agent, the system 10 and the return order generating unit 240 consider a number of different parameters, including for example the current inventory levels, future predicted returns, and existing customer orders to determine if the item needs to be directed to the stacks or carousels 220 of the automated fulfillment system 16 or to static warehouse locations.

Figure 20:
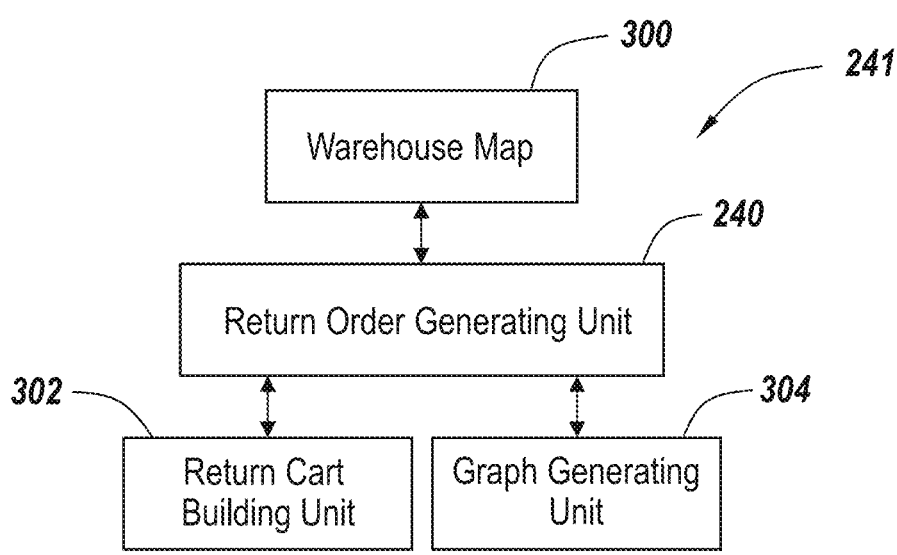
FIG. 20 is a schematic block diagram illustrating the return order generating unit and associated components according to the teachings of the present invention.
Figure 21:
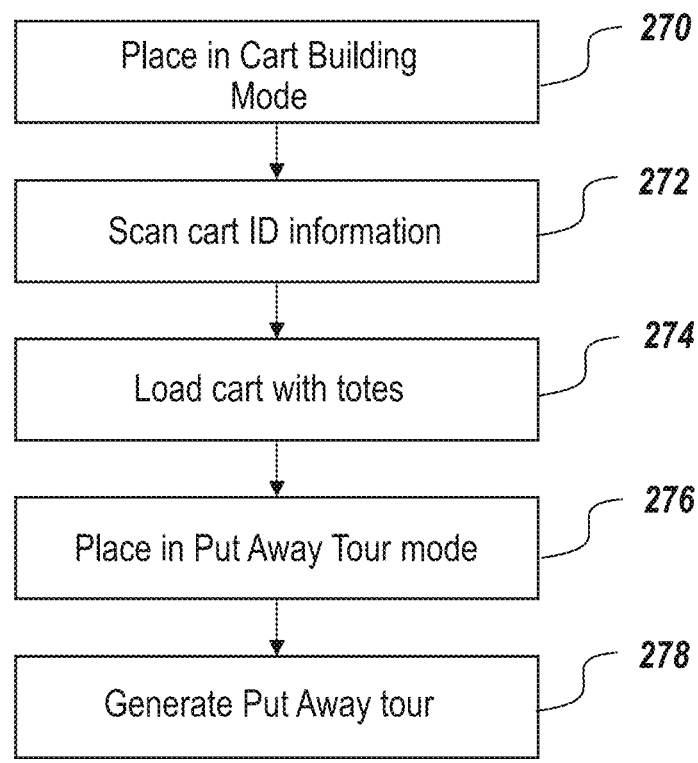
FIG. 21 is a schematic flow chart diagram illustrating the steps involved with generating a return or put away tour according to the teachings of the present invention.

For example, as shown in FIG. 20, the return order generating unit 240 forms part of the illustrated return order generating sub-system 241. This sub-system is similar to the sub-system 29. The return order generating sub-system 241 includes for example the return order generating unit 240. The return order generating sub-system 241 can also include a warehouse map unit 300 for storing a graph, map or other representation of the warehouse layout or footprint ("map"). The warehouse map can include indicia indicative of multiple rows of shelving, as well as indicia associated with the bays or vertical locations located along the rows of shelving. Other types of marking or location related information can also be used. The warehouse map unit 300 can be any selected storage element that is configured for storing warehouse map data. The warehouse map unit 300 can be a stand-alone storage element or can be integrated with one or more other system units, such as for example with the database 24 or the return order generating unit 240. For the sake of simplicity, the warehouse map unit 300 is illustrated as a separate unit. The warehouse map unit 300 can also store the locations in the warehouse where various items are stored, as well as the selected vertical bay at the warehouse location. The items correspond to one or more items that form part of the customer order.

The return order generating sub-system 241 of the present invention can also include a return cart building unit 302 that stores, transmits and receives data associated with a mobile return cart, and specifically includes one or more containers or totes and associated tote data for use by the return agent when building the return cart. The tote data can correspond to data associated with specific totes as well as to sub-compartments within the totes. The totes and associated sub-compartments are arranged and scheduled consistent with the items to be returned to the warehouse by the return agent. Similar to the warehouse map unit 300, the cart building unit 302 can be a separate element or can form part of the return order generating unit 240. The totes on the return cart can be uniquely identified by identification (ID) information, which can include any type of suitable data, including for example alphanumeric data. The ID information can be encoded in a barcode that can be placed on the front or back of the tote that is scanned while on a cart or on a suitable transport system (e.g., a conveyor belt) within the warehouse. The tote can include one or more sub-compartments, such as for example anywhere from between 1 to 24 sub-compartments. In addition to the barcodes on the exterior of the tote, each sub-compartment of the tote can also include if desired unique identification information, such as for example a barcode. The ID information associated with each sub-compartment and/or each tote is used and scanned by the return agent. The sub-compartments can house one or more selected items associated with an item to be returned. The ID information of the tote and cart can be exchanged with the return cart building unit 302 and/or with the return order generating unit 240.

According to one practice, the return order generating unit 240 can for example optionally perform a mapping between the items to be returned and contained within the totes and warehouse locations in the form of a map, such as a shipment-bay graph. This mapping or graphing can be performed by the graph generating unit 304, which is similar to the graph generating unit 124. The graph generating unit 304 can be a separate element or can form part of the return order generating unit 240. The graphing can be performed in a manner so as to optimize the time and distance that a return agent needs to travel when returning or replenishing certain items. The items correspond to one or more portions of one or more customer orders that have been returned by a customer. The graphing can also be optimized so as to avoid potential collisions between pick and return agents and to consider the location of any selected transport system, such as conveyor belts, so as to ensure that the pick agent has relatively easy and speedy access to the transport system. The graph generating unit 304 also generates the graph employing shipments or customer orders that include more than one item located at more than one location. The illustrated graph generating unit 304 can optionally employ a value sorted tree map technique when generating the map or graph, similar to the value sorted tree maps 130 shown for example in FIGS. 9A and 9B. For each returned item, the return order generating sub-system 241 determines a corresponding warehouse location, and then determine a warehouse bay from the location. The value sorted tree map or graph is then value sorted by the first bay location, bay count, and then subsequent bay location.

Once the return cart has been built, the return order generating unit 240 then constructs a return tour having return instructions or tasks associated therewith. The return tour essentially provides a schedule or list of tasks for the return agent to follow. The return tour is constructed or generated by the return order generating unit 240 so as to optimize the path distance through the warehouse as well as the number of return tasks that the return agent can execute when eventually performing the return tour. Factors that the return order generating unit 240 considers when optimizing or constructing the pick tour plan can include but are not limited to avoiding impediments or obstacles within the warehouse, such as for example walls and machinery, preferred human walking paths, opportunistic drop-off points like the central conveyor belt and location stock density as well as travel distance and quantities and locations of items that need to be returned. Permissions required of the return agent are also considered as returning expensive items, oversized items, or fragile items that may require different levels of authorization or skill to perform. For example, a new agent may not have permission to execute a return tour that contains important or expensive items.

Further, the return cart building unit 302 enables the return agent to build a return cart by associating one or more totes with a specific mobile cart. Once the return cart is built, the return order generating unit 240 can generate a return tour based on the specific items within the totes assigned to the return cart. The return tours are preferably constructed or generated so as to minimize the overall or total walking distance by the return agent. The return tours can include a list or set of return tasks that can be optionally segmented or partitioned into selected warehouse locations, thus creating different return tasks for each or different warehouse zones.

The order fulfillment system 10 and the return order generating sub-system 241 provide the ability to reconfigure totes on a return cart, such as by the return cart building unit 302, by choosing different tote configurations while concomitantly allowing the return agent to move or place items in various totes to ensure that the items are securely located within the tote. Because the items can vary in type, size and quantity, the return agent needs to be able to reconfigure the contents of the totes. The return agent is also provided via the handheld device with information and images through-out the return process to ensure the accurate slotting and put-away of the returned items.

Further, the order fulfillment system 10 and the return order generating unit 240, prior to returning the items to the warehouse, can also check to determine if the item to be returned forms part of a new or existing customer order that has yet to be picked. If so, the item can be routed to an existing order tote and eventually sent to the packing and shipping subsystem 22 for shipment to the customer.

The returned items can then be placed within one or more compartments or sub-compartments of a tote or carrier element that form part of a return cart. The return cart building unit 302 determines the number of totes and sub-compartments associated with each tote of the return cart. The compartments of the tote can have associated therewith identification (ID) information, such as alphanumeric data, barcode data, or positional coordinates within the tote, identifying the specific compartment within the tote as well as the specific tote. The ID information associated with each compartment or sub-compartment is scanned by the return agent. The ID information can be exchanged with or provided to, for example, the return order generating unit 240. The returned items are added to the tote until the return order generating sub-system 241 determines that there exist enough items in the tote to be returned to the warehouse. The return cart can be built according to this technique.

Alternatively, according to another practice, the return agent can fill selected totes and associated sub-compartments with items to be returned to the warehouse. The tote is then moved to a selected area in the warehouse by any suitable transport or conveying mechanism, including a conveyor belt system, such as for example a portion of the conveyor system 226. The totes can be temporarily stored in a holding area awaiting a return agent to construct a return cart. The totes can be conveyed to the automated fulfillment system 16 and/or to the return agents. The totes can be constructed using logic that enables a return agent during a put away or return tour to optimize the distance and time during the tour. The returned items can be sorted among multiple totes during item processing so as to arrange the totes in a manner to optimize the returns to the warehouse.

Figure 19A:
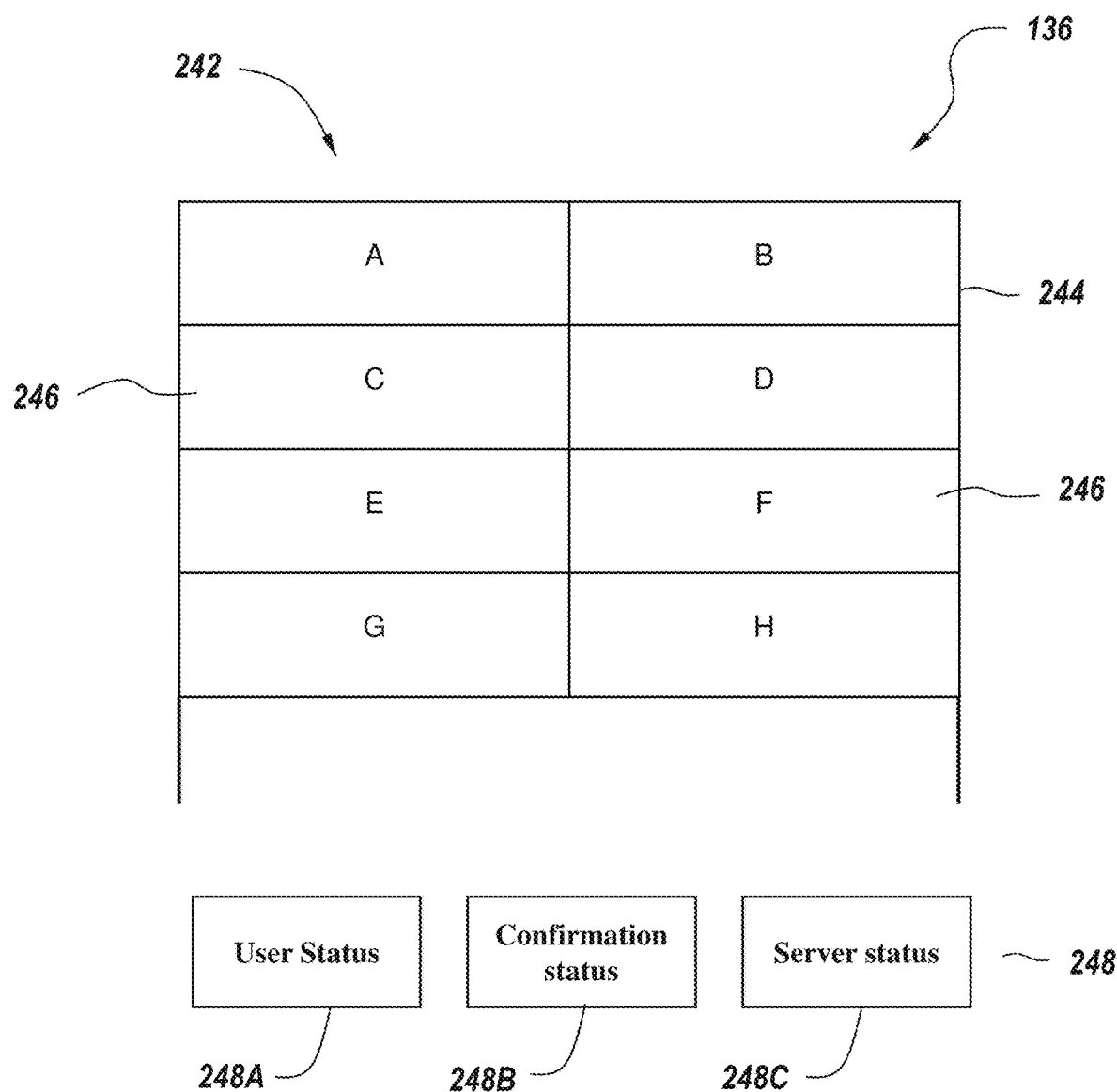
FIG. 19A is a schematic representation of a display of an electronic device, such as a handheld scanner, for depicting a return cart for returning items returned by a customer to the warehouse.

The return order generating sub-system 241, and specifically the return cart building unit 302, can employ a hand held device that has an interface or display 136 adapted for building the return or put away cart. The handheld device can include an appropriate processor, display, keypad, memory, and scanner, as well as other suitable and well known electronic components. The handheld device communicates with the return order generating unit 240. The handheld device can include software and hardware for placing the device in a Return Cart Builder mode 302, in addition to the foregoing Pick Tour Cart Building mode (FIG. 10), for building a mobile put-away or return cart. The display 136 of the handheld device can display a re-creation of the mobile return cart. An example of a suitable display on the interface/display 136 is shown in FIG. 19A. The illustrated region 242 of the display 136 can display a representation of a return cart 244 that can be constructed by the return agent and representations of totes 246 thereon in a specific manner or sequence. The return agent initially takes a first tote from the holding area and then scans the identification information on the tote and then scans the return cart to associate the tote with the cart 244. If necessary, the return agent can scan the identification information on one or more individual compartments of the tote as well. The display 136 on the handheld device then visually indicates the area or areas of the cart 244 that can accept totes 246. The return agent can highlight or select a tote area (e.g., tote areas A-H) of the cart 244 in the display region 242, which corresponds to particular tote locations. For example, if tote area A is selected, then the pick agent scans the identification information of the first tote and places the first tote in tote area A of the cart. The tote is now associated with that specific tote area of a specific return cart. The return agent then selects a second tote area on the display of the handheld device, such as for example tote area B, and then scans the identification area of a second tote. The second tote is placed on the cart at the selected area, and the second tote is now associated with tote area B. This process is repeated until a specific number of totes are loaded in the mobile return cart 244.

The illustrated display 136 can also include any selected number of bottom sub-regions 246. For example, the display can include sub-regions 248A, 248B, and 248C. The sub-region 248A can provide and display information associated with the user status. The sub-region 248B can provide and display information associated with the confirmation status of the cart 244 and/or totes. The agent can activate this feature by selecting the confirmation status to confirm the loading of a tote or to cancel a tote. The sub-region 248B can also be employed to clear the contents of the cart. The sub-region 248C can be used to indicate the status of the server (e.g., return order generating unit 240), such as whether the handheld device is properly communicating with the server or the system 10.

Once the mobile return cart 244 has been constructed, the return agent can access or communicate with the order fulfillment system 10 and specifically the return order generating unit 240 via the handheld device. The handheld device can be disposed in a Put Away or Return mode. The Put Away mode requests that the return order generating unit 240 create or construct a put away or return tour that enables the return agent to put away the items in the totes. The put away or return tour is similar to the pick tour, as described above. As used herein, the term "put away tour" or "return tour" is intended to mean a series of instruction that include one or more return instructions or tasks that when aggregated or consolidated together form a tour. The tour is in essence a series of instructions sent to the return agent to put back or return one or more items associated with one or more customer orders to selected locations within the warehouse. Alternatively, the return tour can involve returning items to the automated fulfillment system 16, which receives the aggregated list of items via a tote or from the return tour generated by the return order generating unit 240 and returns the items to selected locations within the automated fulfillment system 16.

According to this embodiment, the formation or loading of the return totes is performed first and hence is initially decoupled from the return cart. This enables the returns to be processed in a separate location of the warehouse or in a separate facility. Further, the return cart building unit can include logic for preventing the loading or assignment of a tote to more than one return cart or assigning the tote to a return cart that already has a return tour in progress.

The handheld device also includes a Tote Lookup mode that allows the return agent to identify the items or contents in a specific tote, as well as the destination of the tote. This mode is also helpful if a tote or mobile return cart 244 with a number of totes is dropped or turned over. The Tote Lookup mode can assist the return agent in identifying the contents of the tote and cart so as to enable the agent to rebuild the tote or cart.

During the put away or return tour, the display 136 of the device presents a visual interface that guides the pick agent along the put away or return tour. The return tour guides the return agent to selected locations in the warehouse so that the agent can return items from the totes in the cart to the warehouse locations. The totes in the mobile cart can have any selected number of sub-compartments depending upon the arrangement of the specific tote. For example, the totes can be divided into or support compartment dimensions of 1×1, 2×1, 2×2, 3×2, 3×4, and 6×4. The various arrangements thus allow for up to 192 total compartments per cart for a put away tour. Each compartment preferably contains a selected quantity of a single item.

Figure 19B:
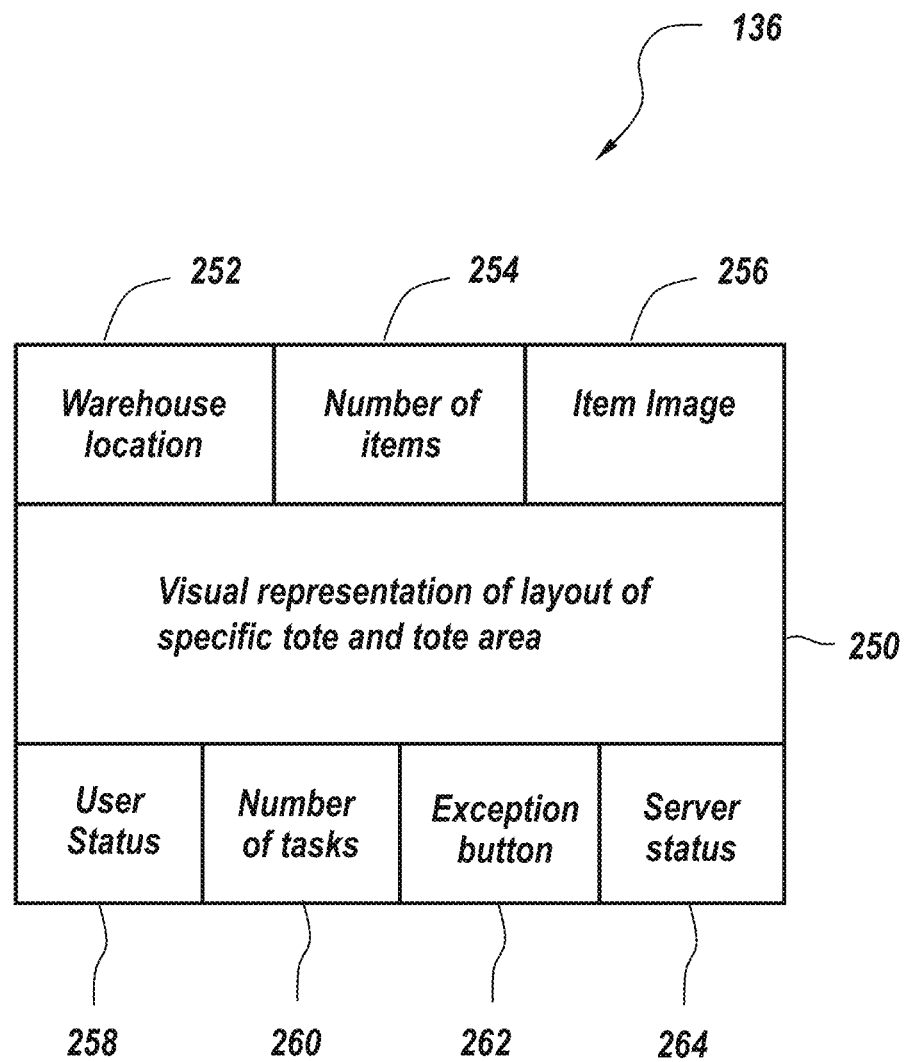
FIG. 19B is a further schematic representation of a display of an electronic device, such as a handheld scanner, for showing the information associated with a return tour and associated returned items to be returned to the warehouse.

During the return tour, the handheld device assists the return agent in identifying the tote and tote location of the item to be returned at each location in the put away or return tour. For example, as shown in FIG. 19B, the display 136 has a series of dedicated regions or areas that display selected types of information associated with the return tour as well as the totes on the return cart 244. For example, the display has a top area or region that has top sub-regions 252, 254, 256, a central area or region 250, and a bottom area or region that has bottom sub-regions 258, 260, 262, and 264. The top sub-region 252 can set forth the warehouse location and bay of the item to be returned or put away. The warehouse location and bay can have identification information associated therewith, such as a barcode. The handheld device can scan the barcode of the location, and if the location matches the location displayed in the sub-region 252, a visual or audible alert can be provided. For example, the sub-region can change color to visually indicate that a match exists. Conversely, the handheld device can produce an audible sound or generate a tactile sensation. The number of items to be returned can be displayed in the sub-region 254, and a visual representation of the item to be returned can be displayed in the sub-region 256. The return agent can thus perform a secondary visual check to ensure that the picked item visually matches the item displayed in the sub-region 256. This provides redundancy in the system to ensure that the return agent is selecting or returning the correct item.

The central region of the display 250 can display a visual representation of the physical layout of a specific tote. For example, if the tote in tote area A on the mobile cart has a 3×4 layout configuration, then there are four rows and three columns of compartments in the tote layout. If the item displayed in sub-region 256 is to be returned at the selected location, and the item is located at location 2, 3 (e.g., second column, third row) of the tote, then this location can be highlighted on the display 136 so as to provide a visual guide or indication to the return agent. The return agent retrieves the number of items set forth in sub-region 254 from the tote, and scans the barcode on one of the items. This enables the order fulfillment system 10 to verify that the return agent is returning the correct item to the proper warehouse location.

The bottom sub-region 258 can include a user status icon or visual indication that allows the return agent to pause or cancel the put away or return tour, a task number sub-region 260 that displays the number of tasks in the put away tour as well as the specific task number being performed. For example, if there are 21 tasks in the put away tour and the return agent is in the process of handling task 3, then the display sub-region can show 3/21 in the sub-region 260. The bottom sub-regions can also include an exception button sub-region 262 that allows exception information to be entered, and a visual indicator of the network connection status in sub-region 264.

In operation and as shown in FIGS. 18-22, the system user or return agent places the handheld device in Return Cart Building mode, where the handheld device communicates with the return order generating unit 240, step 270. The Return Cart Building mode can be a function that forms part of the return order generating unit 240 or can be a separate unit, such as the return cart building unit 302 of the return order generating sub-system 241. The Cart Building mode functionality can be added to the interface or display 136 of the handheld device, or can be a selectable function added to the return order generating unit 240. For example, the return order generating unit 240 can include a processor, memory, and if desired a display for visually displaying the Cart Building mode functionality. The user can then select this functionality.

The return agent can then scan or enter the ID information associated with the cart, step 272. The user can select either a mobile cart for returning or replenishing items in the warehouse, or a static return cart for use with the automated fulfillment system 16. Specifically, the user can select the type of cart that can be constructed. The display 136 preferably includes in addition the display region 242 the bottom sub-regions 248, which includes regions 248A, 248B, and 248C. The regions includes icons or other selectable visual representations of actions that can be selected by the user. The actions include the ability to select the mobile cart for the warehouse and look up the content of the totes. The user then obtains the ID information associated with the selected totes, and then loads the totes in the cart. The display region 242 can visually highlight selected tote regions or areas A-H of the cart. The visual highlight can include any selected visually distinguishing feature, including the prompt SCAN on one of the areas A-H to visually remind the return agent to scan the tote prior to loading the tote on the cart in the designated tote area (e.g., tote areas A-H). Once the tote is scanned and loaded on the cart, the system 10 moves the SCAN prompt to another unfilled tote area or regions A-H of the cart. This process continues until the return cart is properly loaded with totes and is ready for the put away tour, step 274. The interface or display 136 of the handheld device then displays the various options available to the return agent once the cart is loaded. These options include the ability to place the handheld device in the Put Away Tour mode, step 276. The put away tour mode instructs the order fulfillment system 10, and specifically the return order generating unit 240, to generate the put away or return tour, step 278. The put away tour is communicated to the handheld device, and the return agent starts the put away tour.

Alternatively, the put-away totes from the cart may be directly introduced into the automated fulfillment system 16. The contents of the compartmentalized totes are electronically transmitted to the automated fulfillment system 16 once the tote has been filled with the items to be returned. Once the compartmentalized tote containing the returned items has been introduced into the automated system, the pick stations may be run in an alternate return mode where instead of picking items from storage tubs and placing them in order totes as is performed in the picking mode during a bulk or pick tour, the items are instead picked from the return tote and placed back into the storage tubs of the same products. This effectively distributes the contents of the return tote back into the storage tubs of the automated fulfillment system 16. Once the return tote has been emptied, it may be routed back to the return processing area of the warehouse and used once again.

As noted above, the items returned by the customers are received from the package carriers, such as the United States Post Office, United Parcel Service (UPS) and the like, in selected bins. Each customer package is opened by a return processing agent, and each of the items being returned is thoroughly examined. The items that are still in their original packaging and unopened or items that are still in pristine condition can be returned to stock. When returning an item back to stock, there are multiple factors that the system 10 and specifically the return order generating unit 240 use when deciding where the item should be placed in stock in the warehouse. These factors include, but are not limited to, existing product storage locations in the warehouse, the velocity (i.e., sales volume or customer demand for the item) of the product, if the product may have additional incoming items from an existing purchase order to a vendor that it can be joined with in the near future, and the like. Although the automated fulfillment system 16 can process the items faster than the agent, it is often an expensive and limited resource, thus "static" shelving systems are often used. High velocity items and items that are likely to sell quickly can be placed in the automated fulfillment system 16. Low velocity items and items that are not likely to sell quickly can be placed in a shelving or bays of the warehouse.

The return agent is directed where to place the customer items based on the foregoing rules or factors. Additional sorting of which return agent is processing an item to be returned may be performed before opening the item if an RMA (Return Merchandise Authorization) process is in place, where the return order generating unit 240 is aware of what is in a package before the package is opened. This allows for sorting the packages into separate processing stations to try to leverage location based consolidation of items for put-away. Without an RMA process, it is difficult to determine what is in a package before an agent opens the package. For this reason, the item placement into totes is based on the order in which the return agent processes the customer return packages. For this reason, the put-away tours are constructed for an optimal walking path and sequence for the put-away tasks for a set of returned items that are stored in totes placed on a mobile cart for return to static areas in the warehouse that contain the same products. For the automated fulfillment system 16, a "return" mode guides the placement of compartmentalized items back into storage totes containing the same items so that they can undergo the picking process again in the future.

Figure 22:
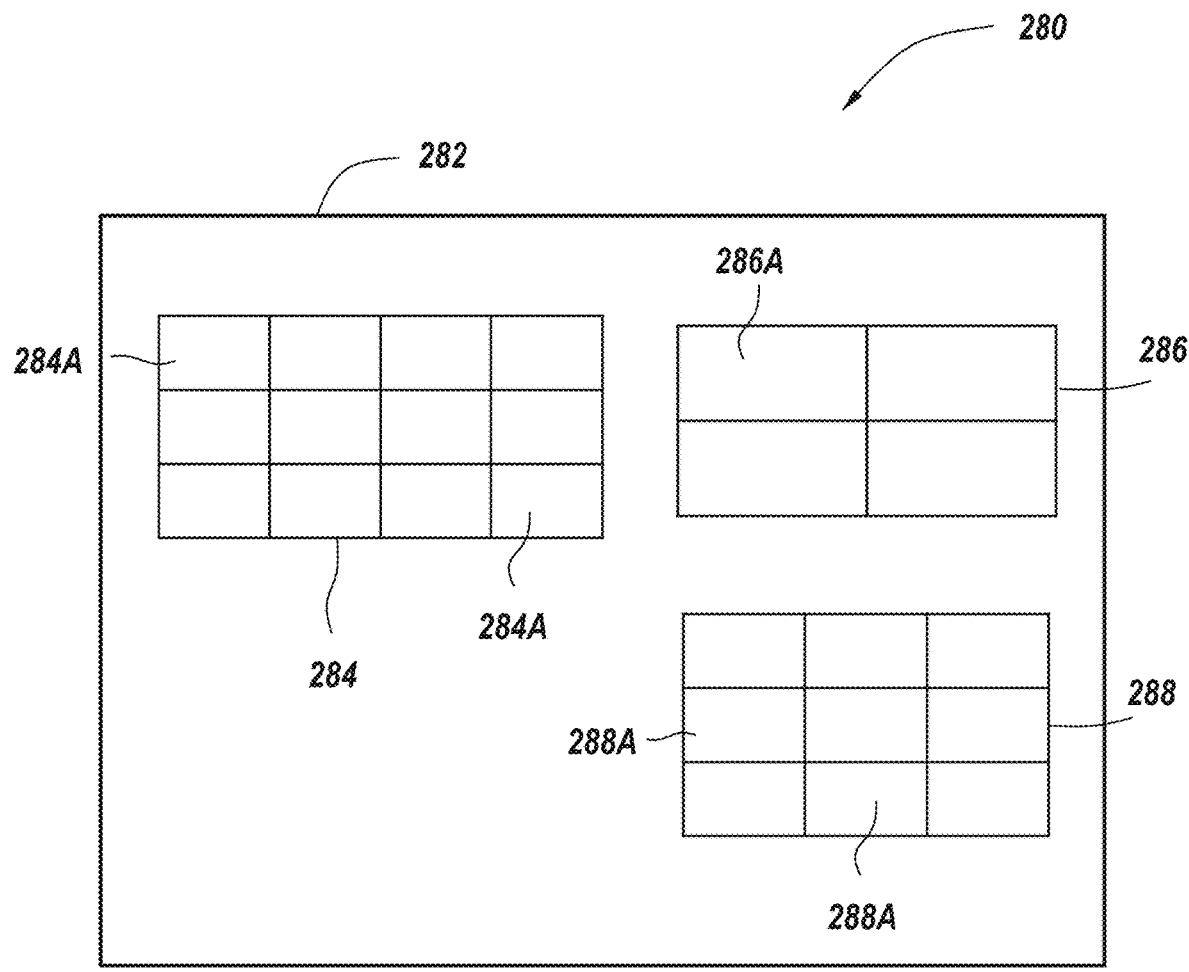
FIG. 22 is a schematic representation of the display of an electronic device, such as a scanner, illustrating the various totes and associated sub-compartments that form part of a return cart according to the teachings of the present invention.

FIG. 22 shows an example of the return processing application 280 of the return order generating unit 240 that guides the return agents to place returned items into specific sub-compartments of a tote. As shown, the application has a window or interface 282 that can be displayed on a display of an electronic or computing device that shows virtual representations of totes and associated tote sub-compartments suitable for use for returning items to the warehouse as well as functioning as the totes or tubs for the automated fulfillment system 16. For example, the tote 284 displayed in the window or interface 282 is a representation of a tote for a mobile cart for a return agent to place the returned items into bays or static locations in the warehouse. Further, the totes 286, 288 displayed in the right side of the window 282 are totes that are destined for selected locations in the automated fulfillment system 16. For example, the tote 286 can be destined for the upper portions or regions of the automated fulfillment system 16 and the tote 288 can be destined for lower portions or regions of the automated fulfillment system 16. The totes 284, 286, 288 can be configured to have any selected number of sub-compartments, as illustrated, so as to accommodate items of different sizes. For example, the tote 284 has a series of sub-compartments 284A; the tote 286 has a series of sub-compartments 286A; and the tote 288 has a series of sub-compartments 288A. The agent processing the returned items can assign an item to one or more of the sub-compartments of each tote 284, 286, 288, and identification information can be associated with each tote and optionally each of the sub-compartments of the tote, and the ID information of the tote and sub-compartments can be entered into the system and hence associated or correlated with a specific item to be returned. The images of the items can be visually shown on the display in each of the sub-compartments of the totes so as to provide a visual representation of the item for the agent. This assists the agent when placing the item in the assigned sub-compartment of the tote. Once the specific tote has been filled, it can be directly introduced into the automated fulfillment system 16 or conveyed by a transport system to a return tote holding area. The totes can then be assigned to a return cart 244 via the cart builder mode for static put-away by the return agent. The barcode of a new tote can then be scanned and put in place of the previous tote and the agent continues processing customer returns.

Exemplary Hardware

Following below and referenced above are more detailed descriptions of various concepts and associated hardware of the units of the order fulfillment system 10 of the present invention. It should be appreciated that various concepts introduced above and discussed in greater detail below may be implemented in any number of ways, as the disclosed concepts are not limited to any particular manner of implementation. Examples of specific implementations and applications are provided below primarily for illustrative purposes and for providing or describing the operating environment of the order fulfillment system of the present invention.

Figure 23:
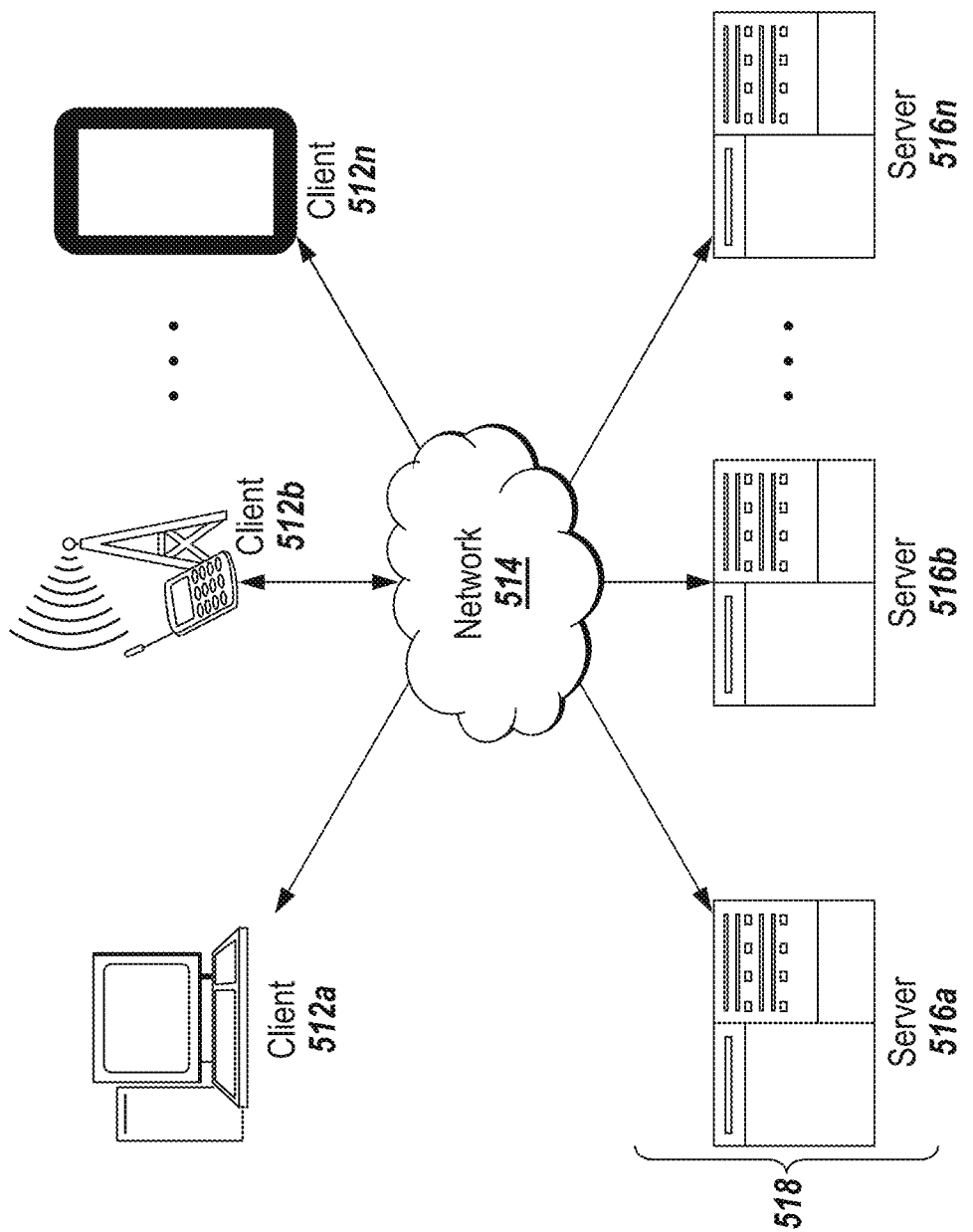
FIG. 23 is a schematic block diagram depicting an embodiment of a network environment comprising client devices in communication with servers through a network arrangement.

Consistent with the foregoing inventive embodiments, it is helpful to describe aspects of the operating environment as well as associated system components (e.g., hardware elements) in connection with the methods and systems described herein. For example, the order fulfillment system 10 of the present invention and associated sub-systems and units, including for example the order collection unit 12, the order generating unit 14, the automated fulfillment system 16, the bulk pick order fulfillment unit 18, the packing and shipping sub-system 22, the pick tour generating unit 20, the cart building unit 128, the graph generating unit 124, the return order generating unit 240, the database 24, and any other hardware devices including hand-held scanners, servers, computers, monitors and printers, can be coupled together in a network environment. Further, any system unit or combination of units can be consolidated on a single hardware device. For example, as shown in FIG. 23, a typical network environment can include hardware devices such as one or more clients 512a-512n (also generally referred to as local machine(s) 512, client(s) 512, client node(s) 512, client machine(s) 512, client computer(s) 512, client device(s) 512, endpoint(s) 512, or endpoint node(s) 512) in communication with one or more servers 516a-516n (also generally referred to as server(s) 516, node 516, or remote machine(s) 516) and databases via one or more networks 514. In some embodiments, a client 512 has the capacity to function as both a client node seeking access to resources provided by a server and as a server providing access to hosted resources for other clients 512a-512n. The clients can be any suitable electronic or computing device, including for example, a computer, a server, a smartphone, a smart electronic pad, a portable computer, and the like, such as the computing device 600. The various units 12, 14, 18, 20 and database 24 of the order fulfillment system 10 of the present invention can be implemented as a client device 512 and/or a server 516. The sub-systems 16 and 22 of the system 10 can communicate with the remainder of the system 10 via the network 514. Although FIG. 23 shows a network 514 between the clients 512 and the servers 516, the clients 512 and the servers 516 may be on the same network 514. In some embodiments, there are multiple networks 514 between the clients 512 and the servers 516. In one of these embodiments, a network 514' (not shown) may be a private network and a network 514 may be a public network. In another of these embodiments, a network 514 may be a private network and a network 514' a public network. In still another of these embodiments, networks 514 and 514' may both be private networks.

The network 514 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile. Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 514 may be any type and/or form of network. The geographical scope of the network 514 may vary widely and the network 514 can be a body area network (BAN), a personal area network (PAN), a local-area network (LAN), e.g. Intranet, a metropolitan area network (MAN), a wide area network (WAN), or the Internet. The topology of the network 514 may be of any form and may include, e.g., any of the following: point-to-point, bus, star, ring, mesh, or tree. The network 514 may be an overlay network, which is virtual and sits on top of one or more layers of other networks 514'. The network 514 may be of any such network topology as known to those ordinarily skilled in the art capable of supporting the operations described herein. The network 514 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 514 may be a type of a broadcast network, a telecommunications network, a data communication network, or a computer network.

In some embodiments, the network system may include multiple, logically-grouped servers 516. In one of these embodiments, the logical group of servers may be referred to as a server farm 518 or a machine farm 518. In another of these embodiments, the servers 516 may be geographically dispersed. In other embodiments, a machine farm 518 may be administered as a single entity. In still other embodiments, the machine farm 518 includes a plurality of machine farms 518. The servers 516 within each machine farm 518 can be heterogeneous, and one or more of the servers 516 or machines 516 can operate according to one type of operating system platform (e.g., WINDOWS NT, manufactured by Microsoft Corp. of Redmond, Wash.), while one or more of the other servers 516 can operate according to another type of operating system platform (e.g., Unix, Linux, or Mac OS X).

In one embodiment, servers 516 in the machine farm 518 may be stored in high-density rack systems, along with associated storage systems, and located in an enterprise data center. In this embodiment, consolidating the servers 516 in this way may improve system manageability, data security, the physical security of the system, and system performance by locating servers 516 and high performance storage systems on localized high performance networks. Centralizing the servers 516 and storage systems and coupling them with advanced system management tools allows more efficient use of server resources.

The servers 516 of each machine farm 518 do not need to be physically proximate to another server 516 in the same machine farm 518. Thus, the group of servers 516 logically grouped as a machine farm 518 may be interconnected using a wide-area network (WAN) connection or a metropolitan-area network (MAN) connection. For example, a machine farm 518 may include servers 516 physically located in different continents or different regions of a continent, country, state, city, campus, or room. Data transmission speeds between servers 516 in the machine farm 518 can be increased if the servers 516 are connected using a local-area network (LAN) connection or some form of direct connection. Additionally, a heterogeneous machine farm 518 may include one or more servers 516 operating according to a type of operating system, while one or more other servers 516 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 518 may be de-centralized. For example, one or more servers 516 may comprise components, subsystems and modules to support one or more management services for the machine farm 518. In one of these embodiments, one or more servers 516 provide functionality for management of dynamic data, including techniques for handling failover, data replication, and increasing the robustness of the machine farm 518. Each server 516 may communicate with a persistent store and, in some embodiments, with a dynamic store.

Server 516 may be a file server, application server, web server, proxy server, appliance, network appliance, gateway, gateway server, virtualization server, deployment server, SSL VPN server, or firewall, or any other suitable computing device, such as computing device 600. In one embodiment, the server 516 may be referred to as a remote machine or a node. In another embodiment, a plurality of nodes may be in the path between any two communicating servers. The units 12, 14, 18, 20 and 240 of the order fulfillment system 10, FIG. 1, as well as the warehouse map unit 120, cart building unit 128 and the graph generating unit 124 of the present invention can be stored or implemented on one or more of the servers 516 or clients 512, and the hardware associated with the server or client, such as the processor or CPU and memory.

Figure 24:
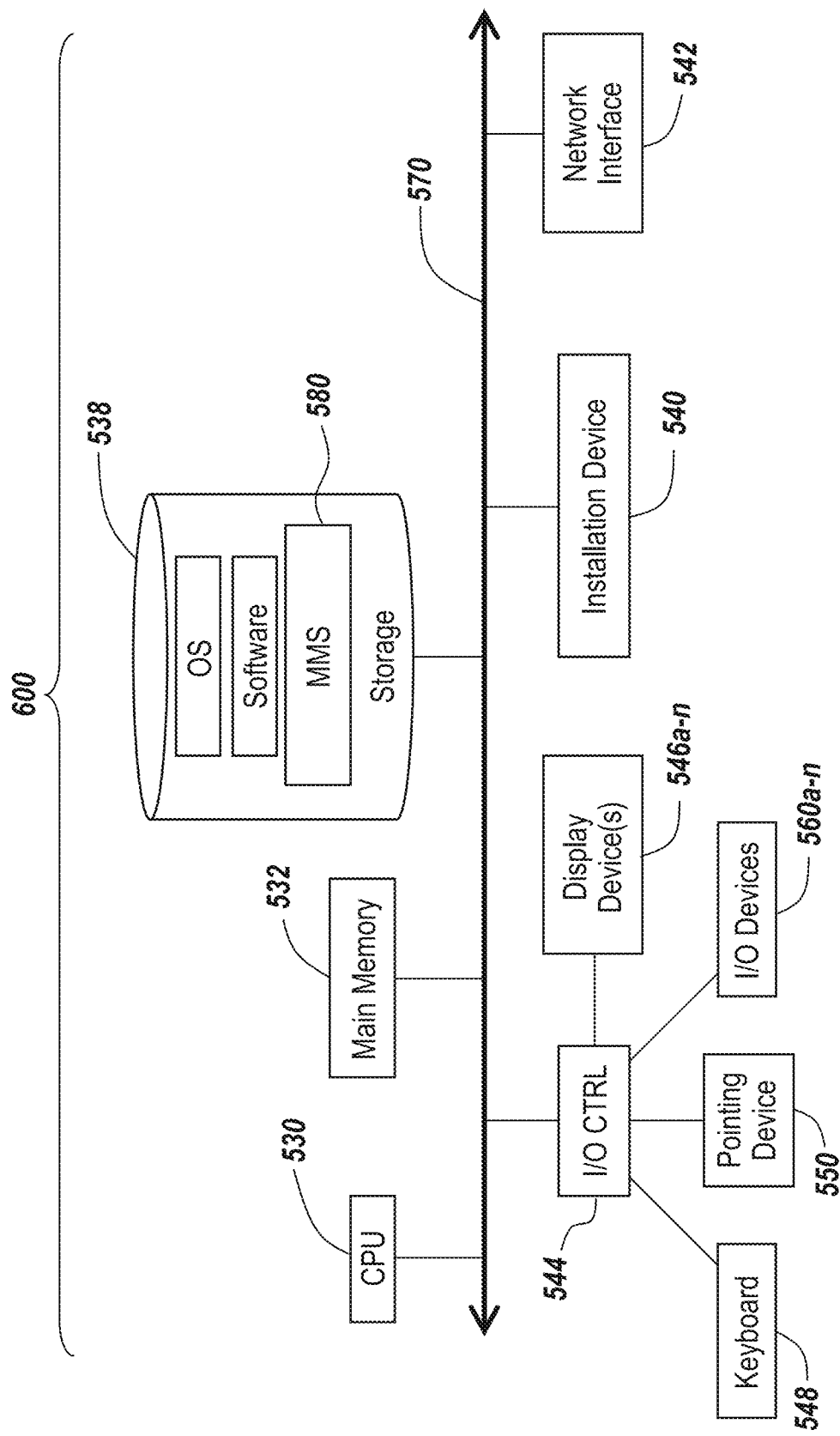
FIGS. 24 and 25 are schematic block diagrams depicting embodiments of computing devices useful for the methods and systems described herein.
Figure 25:
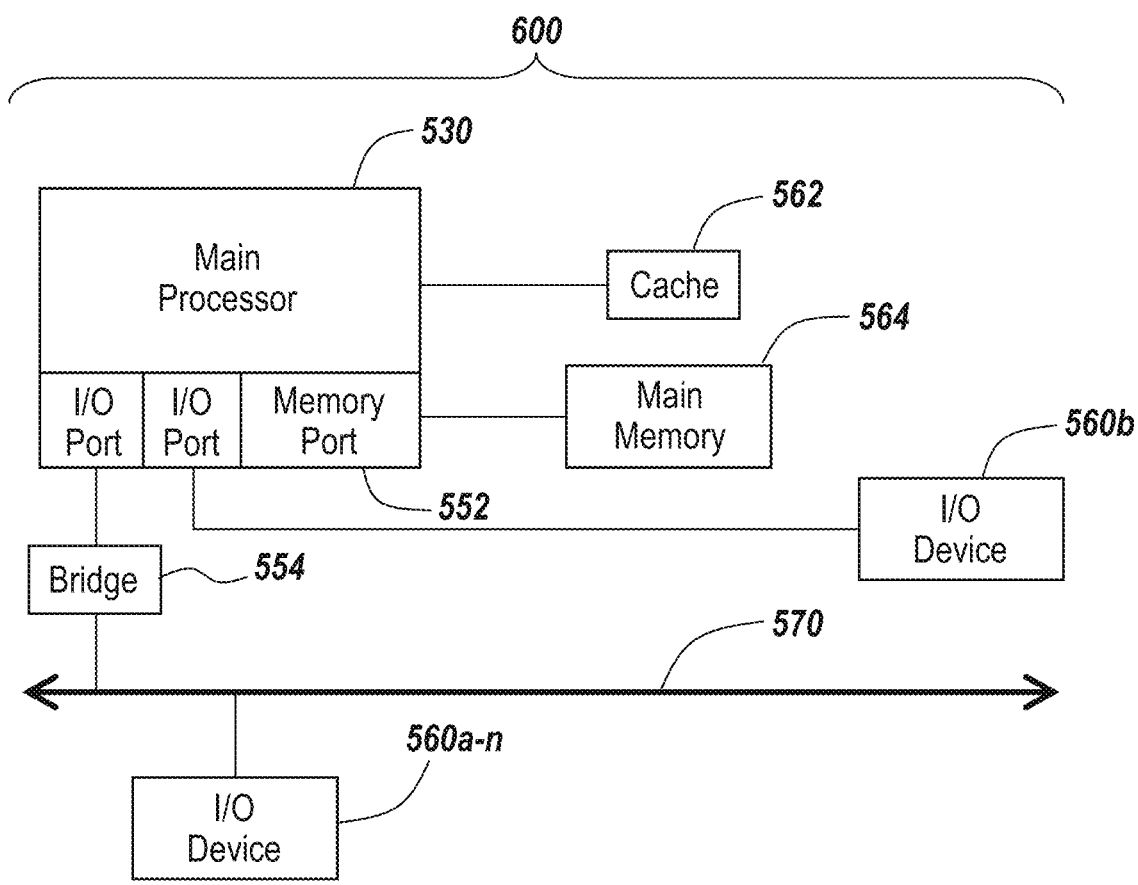

The client 512 and server 516 may be deployed as and/or executed on any type and form of computing device, such as for example a computer, network device or appliance capable of communicating on any type and form of network and performing the operations described herein. FIGS. 24 and 25 depict block diagrams of a computing device 600 useful for practicing an embodiment of the client 512 and/or a server 516, and thus by extension any unit or combination of units 12, 14, 18 and 20 of the order fulfillment system 10 of the present invention. As shown in FIGS. 24 and 25, each computing device 600 includes a central processing unit 530, and a main memory unit 532. As shown in FIG. 24, a computing device 600 may include a storage device 538, an installation device 540, a network interface 542, an I/O controller 544, display devices 546a-546n, a keyboard 548 and a pointing device 550, e.g. a mouse. The storage device 538 may include, without limitation, an operating system, and/or software. As shown in FIG. 25, each computing device 600 may also include additional optional elements, e.g. a memory port 552, a bridge 554, one or more input/output devices 560a-560n (generally referred to using reference numeral 560), and a cache memory 562 in communication with the central processing unit 530.

The central processing unit 530 is any logic circuitry that responds to and processes instructions fetched from the main memory unit 564. In many embodiments, the central processing unit 530 is provided by a microprocessor unit, e.g.: those manufactured by Intel Corporation of Mountain View, Calif; those manufactured by Motorola Corporation of Schaumburg, Ill.; the ARM processor and TEGRA system on a chip (SoC) manufactured by Nvidia of Santa Clara, Calif; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 530 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit or main memory storage unit 564 may include one or more memory chips capable of storing data and allowing any storage location to be directly accessed by the processor 530. The main memory unit 564 may be volatile and faster than memory of the storage unit 538. Main memory units 564 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 564 or the storage 538 may be non-volatile, e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 564 may be based on any of the above described memory chips, or any other available memory chips capable of operating as described herein. In the embodiment shown in FIG. 24, the processor 530 communicates with main memory 532 via a system bus 570 (described in more detail below). FIG. 25 depicts an embodiment of a computing device 600 in which the processor communicates directly with main memory 564 via a memory port 552. For example, in FIG. 25 the main memory 564 may be DRDRAM. The computer executable instructions of the present invention may be provided using any computer-readable media that is accessible by the computing or electronic device 600. Computer-readable media may include, for example, the computer memory or storage unit 564, 538 described above. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 564, 538 is shown within the computing device 600 it will be appreciated that the storage may be distributed or located remotely and accessed via a network or other communication link.

FIG. 25 depicts an embodiment in which the main processor 530 communicates directly with cache memory 562 via a secondary bus, sometimes referred to as a backside bus. In other embodiments, the main processor 530 communicates with cache memory 562 using the system bus 570. Cache memory 562 typically has a faster response time than main memory 564 and is typically provided by SRAM, B SRAM, or EDRAM. In the embodiment shown in FIG. 25, the processor 530 communicates with various I/O devices 560 via a local system bus 570. Various buses may be used to connect the central processing unit 530 to any of the I/O devices 560, including a PCI bus, a PCI-X bus, or a PCI-Express bus, or a NuBus. For embodiments in which the I/O device is a video display 546, the processor 530 may use an Advanced Graphics Port (AGP) to communicate with the display 546 or the I/O controller 544 for the display 546. FIG. 25 depicts an embodiment of a computer 600 in which the main processor 530 communicates directly with I/O device 560b or other processors 530 via HYPERTRANSPORT, RAPIDIO, or INFINIBAND communications technology. FIG. 25 also depicts an embodiment in which local busses and direct communication are mixed: the processor 530 communicates with I/O device 560a using a local interconnect bus while communicating with I/O device 560b directly.

A wide variety of I/O devices 560a-560n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, and printers such as inkjet printers, laser printers, and 3D printers.

Devices 560a-560n may include a combination of multiple input or output devices, including, e.g., Microsoft KINECT, Nintendo Wiimote for the WII, Nintendo WII U GAMEPAD, or Apple IPHONE. Some devices 560a-560n allow gesture recognition inputs through combining some of the inputs and outputs. Some devices 560a-560n provides for facial recognition which may be utilized as an input for different purposes including authentication and other commands. Some devices 560a-560n provides for voice recognition and inputs, including, e.g., Microsoft KINECT, SIRI for IPHONE by Apple, Amazon Alexa, Google Now or Google Voice Search.

Additional devices 560a-560n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXEL SENSE or Multi-Touch Collaboration Wall, may have larger surfaces, such as on a table-top or on a wall, and may also interact with other electronic devices. Some I/O devices 560a-560n, display devices 546a-546n or group of devices may be augment reality devices. The I/O devices may be controlled by an I/O controller 44 as shown in FIG. 24. The I/O controller may control one or more I/O devices, such as, e.g., a keyboard 548 and a pointing device 550, e.g., a mouse or optical pen. Furthermore, an I/O device may also provide storage and/or an installation medium 540 for the computing device 600. In still other embodiments, the computing device 600 may provide USB connections (not shown) to receive handheld USB storage devices. In further embodiments, an I/O device 560 may be a bridge between the system bus 570 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 546a-546n may be connected to I/O controller 544. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 546a-546n may also be a head-mounted display (HMD). In some embodiments, display devices 546a-546n or the corresponding I/O controllers 544 may be controlled through or have hardware support for OPENGL or DIRECTX API or other graphics libraries.

In some embodiments, the computing device 600 may include or connect to multiple display devices 546a-546n, which each may be of the same or different type and/or form. As such, any of the I/O devices 560a-560n and/or the I/O controller 544 may include any type and/or form of suitable hardware, software, or combination of hardware and software to support, enable or provide for the connection and use of multiple display devices 546a-546n by the computing device 600. For example, the computing device 600 may include any type and/or form of video adapter, video card, driver, and/or library to interface, communicate, connect or otherwise use the display devices 546a-546n. In one embodiment, a video adapter may include multiple connectors to interface to multiple display devices 546a-546n. In other embodiments, the computing device 600 may include multiple video adapters, with each video adapter connected to one or more of the display devices 546a-546n. In some embodiments, any portion of the operating system of the computing device 600 may be configured for using multiple displays 546a-546n. In other embodiments, one or more of the display devices 546a-546n may be provided by one or more other computing devices 600a or 600b connected to the computing device 600, via the network 514. In some embodiments software may be designed and constructed to use another computer's display device as a second display device 546a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 546a-546n.

Referring again to FIG. 24, the computing device 600 may comprise a storage device 538 (e.g. one or more hard disk drives or redundant arrays of independent disks) for storing an operating system or other related software, and for storing application software programs such as any program related to the software 580 for the order fulfillment system 10 of the present invention. Examples of storage devices 538 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 538 may be non-volatile, mutable, or read-only. The storage device 538 may be internal and connect to the computing device 600 via a bus 570. Further, the storage device 538 may be external and connect to the computing device 600 via an I/O device 560 that provides an external bus. Some storage devices 538 may connect to the computing device 600 via the network interface 542 over a network 514, including, e.g., the Remote Disk for MACBOOK AIR by Apple. Some client devices 512 may not require a non-volatile storage device 538 and may be thin clients or zero clients 512. The storage device 538 may also be used as an installation device 540, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

The computing device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 512. An application distribution platform may include a repository of applications on a server 516 or a cloud 520, which the clients 512a-512n may access over a network 514. An application distribution platform may include application developed and provided by various developers. A user of a client device 512 may select, purchase and/or download an application via the application distribution platform.

Furthermore, the computing device 600 may include a network interface 542 to interface to the network 514 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 542 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

The computing device 600 of the sort depicted in FIG. 24 may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif, among others. Some operating systems, including, e.g., the CHROME OS by Google, may be used on zero clients or thin clients, including, e.g., CHROMEBOOK S.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is an eBook reader, e.g. the KINDLE family of devices by Amazon.com, or NOOK family of devices by Barnes & Noble, Inc. of New York City, N.Y.

In some embodiments, the computing device 600 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the computing device 600 is a laptop or desktop computer equipped with a web browser and a microphone and speaker system, e.g. a telephony headset. In these embodiments, the computing devices 600 are web-enabled and can receive and initiate phone calls. In some embodiments, a laptop or a desktop computer is also equipped with a webcam or other video capture device that enables video chat and video call. In some embodiments, the computing device 600 is a wearable mobile computing device including but not limited to Google Glass and Samsung Gear.

In some embodiments, the status of one or more machines 512, 516 in the network 514 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the order fulfillment system disclosed herein.

The foregoing description may provide illustration and description of various embodiments of the invention, but is not intended to be exhaustive or to limit the invention to the precise form disclosed. Modifications and variations of the order fulfillment system of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

It is intended that the invention not be limited to the particular embodiments disclosed above, but that the invention will include any and all particular embodiments and equivalents falling within the scope of the following appended claims.

We claim:

1. A customer order fulfillment system for returning items from a customer order to one or more locations in a warehouse, the system comprising:
a return order generating subsystem for assigning returned items in a tote having one or more sub-compartments to a return cart, the return order generating sub-system including:
a map unit for storing a map having map data associated therewith that corresponds each of the returned items with the one or more locations in the warehouse,
a return cart building unit for assigning a plurality of the totes to the return cart, wherein each of the plurality of totes has identification information associated therewith and the return cart has identification information associated therewith, wherein the identification information of the plurality of totes and the return cart are correlated together,
a return order generating unit for generating a return tour for the returned items assigned to the return cart, the return tour having return instructions associated therewith, wherein the return instructions of the return tour correlate the returned items in each of the plurality of totes of the return cart to the locations in the warehouse, and
a graph generating unit for generating a value sorted tree graph by employing a value sorted tree mapping technique based at least on the map data, wherein the value sorted tree graph includes data associating one or more of the return items from the plurality of customer orders with a selected location in the warehouse, the value sorted tree graph is an associative array data type having values associated therewith, and the value sorted tree graph sorts the values in a selected order, and
an interface providing a visual representation of the tote and the associated one or more sub-compartments and providing a visual indicator of the returned items assigned to the one or more sub-compartments of the tote.

2. The customer order fulfillment system of claim 1, further comprising an automated fulfillment system for receiving one or more of the totes and for automatically returning one or more of the returned items in the one or more sub-compartments of the totes to a selected location in one or more carousels.

3. The customer order fulfillment system of claim 1, wherein the interface comprises a window having a visual representation of one or more of the totes and the sub-compartments and for performing the return tour for returning the returned items in the sub-compartments to a plurality of locations in the warehouse, and a visual representation of one or more of the totes and the sub-compartments for performing a return tour for returning the returned items in the sub-compartments to an automated fulfillment system.

4. The customer order fulfillment system of claim 3, wherein the interface comprises additional windows providing an indication of a warehouse location or an indication of a bay for one or more of the returned items, a number of returned items, a returned item image, a user status, and a number of tasks in a return tour or a task number within the return tour.

5. The customer order fulfillment system of claim 1, wherein the customer order includes customer data and returned item data, the customer data includes customer order data, customer address data, and customer name data, and the item data includes product data, product quantity data, barcode data, and return time period data.

6. The customer order fulfillment system of claim 1, further comprising
an order collection unit for collecting information associated with the plurality of customer orders from a plurality of customers and generating customer order data that includes data associated with each of the plurality of customer orders and the plurality of customers, wherein each of the plurality of customer orders includes one or more items associated therewith,
an order generating unit for receiving the customer order data from the order collection unit and generating in response thereto consolidated order fulfillment data,
a pick tour generating subsystem for receiving the consolidated order fulfillment data from the order generating unit and in response thereto generating pick instructions associated with a pick tour or a pick tour plan from the consolidated order fulfillment data, and
a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks forms part of one or more bulk pick tours.

7. The customer order fulfillment system of claim 6, further comprising an automated fulfillment system for receiving the consolidated order fulfillment data from the order generating unit and for automatically selecting one or more of the items in the customer order from one or more carousels, wherein the automated fulfillment system is configured for receiving the pick tour plan or the pick tour and for automatically selecting the items in the customer order set forth in the pick tour plan or the pick tour from the one or more carousels, and is configured for receiving one or more of the plurality of bulk picks for automatically selecting one or more of the items in the customer order from the one or more carousels.

8. The customer order fulfillment system of claim 6, further comprising a graph generating unit for generating a value sorted tree graph by employing a value sorted tree mapping technique based at least on the map data and the consolidated order fulfillment data, and wherein the value sorted tree graph includes data associating one or more of the items from the plurality of customer orders with a selected location in the warehouse.

9. The customer order fulfillment system of claim 8, wherein the locations within the warehouse include one or more bays associated with each location in the warehouse, and wherein the pick tour plan comprises plan data correlating the location of the bay with selected ones of the items at the locations of the bays to be placed in selected totes in the mobile cart.

10. The customer order fulfillment system of claim 9, wherein the pick tour plan is generated by the pick tour generator by mapping the consolidated order fulfillment data generated by the order generating unit with the warehouse configuration stored in the map unit via the graph generating unit.

11. The customer order fulfillment system of claim 10, wherein the pick tour generator converts the pick tour plan into a pick tour, wherein the pick instructions of the pick tour includes an ordered list of pick tasks.

12. The customer order fulfillment system of claim 11, wherein each of the pick tasks includes a plurality of: the location of the bay, identification information associated with the location of the bay, shipping information associated with one or more of the customer orders, a quantity of the items, identification information associated with each of the items, one or more of the items to be picked from the bay, and the tote on the mobile cart in which to place the picked items.

13. The customer order fulfillment system of claim 6, wherein the bulk pick order fulfillment unit groups the items in the consolidated order fulfillment data into shipments according to one or more predetermined logical parameters.

14. The customer order fulfillment system of claim 13, wherein the bulk pick order fulfillment unit includes processing hardware that is configured to:
map the one or more items in each of the plurality of customer orders to product identification data,
generate one or more bulk picks having associated therewith one or more bulk pick recipes from the data associated with the customer orders, wherein each of the bulk pick recipes includes a selected quantity of the one or more items from the plurality of customer orders and a selected quantity of one or more additional items, and
generate a bulk pick ticket associated with each of the bulk picks.

15. The customer order fulfillment system of claim 14, wherein the bulk pick ticket includes information about the one or more items in the bulk pick recipe, and location information associated with the location of the one or more items in the warehouse.

16. The customer order fulfillment system of claim 14, wherein the bulk pick order fulfillment unit generates a connected graph of groupings of the items from the customer orders and the one or more additional items, wherein the items from the customer orders and the additional items form nodes of the connected graph.

17. The customer order fulfillment system of claim 1, wherein the values correspond to the locations in the warehouse or to a number of the items at the locations in the warehouse.

18. A method for returning items from a customer order to one or more locations in a warehouse, the method comprising
providing an interface having a visual representation of a tote having one or more sub-compartments, and providing a visual indicator of the returned items assigned to the one or more sub-compartments of the tote,
storing a map having map data associated therewith that corresponds each of the returned items with the one or more locations in the warehouse,
assigning a plurality of the totes to a mobile return cart, wherein each of the plurality of totes has identification information associated therewith and the return cart has identification information associated therewith, and wherein the identification information of the plurality of totes and the return cart are correlated together,
generating a return tour for the returned items assigned to the return cart, the return tour having return instructions associated therewith, wherein the return instructions of the return tour correlate the returned items in each of the plurality of totes of the return cart to the locations in the warehouse; and
generating a value sorted tree graph by employing a value sorted tree mapping technique based at least on the map data,
wherein the value sorted tree graph includes data associating one or more of the return items from the plurality of customer orders with a selected location in the warehouse, the value sorted tree graph is an associative array data type having values associated therewith, and the value sorted tree graph sorts the values in a selected order.

19. The method of claim 18, further comprising receiving one or more of the totes and for automatically returning one or more of the returned items in the one or more sub-compartments of the totes to a selected location in one or more carousels of an automated fulfillment system.

20. The method of claim 18, wherein the interface comprises a window having a visual representation of one or more of the totes and the sub-compartments and for performing the return tour for returning the returned items in the sub-compartments to a plurality of locations in the warehouse, and a visual representation of one or more of the totes and the sub-compartments for performing a return tour for returning the returned items in the sub-compartments to an automated fulfillment system.

21. The method of claim 18, further comprising
collecting information associated with a plurality of customer orders from a plurality of customers and generating customer order data that includes data associated with each of the plurality of customer orders and the plurality of customers, wherein each of the plurality of customer order includes one or more items associated therewith,
generating in response to the customer order data consolidated order fulfillment data, and
receiving the consolidated order fulfillment data and generating pick instructions associated with a pick tour plan or a pick tour from the consolidated order fulfillment data by a pick tour generating subsystem,
receiving the consolidated order fulfillment data from the order generating unit and grouping together similar ones of the items associated with the plurality of customer orders to form a plurality of bulk picks with a bulk pick order fulfillment unit, wherein one or more of the plurality of bulk picks can form part of one or more bulk pick tours, and
receiving the consolidated order fulfillment data from the order generating unit and for automatically selecting one or more of the items in the customer order from one or more carousels of an automated fulfillment system, wherein the automated fulfillment system is configured for receiving the pick tour plan or the pick tour and for selecting the items in the customer order set forth in the pick tour plan or the pick tour from the one or more carousels, and is configured for receiving one or more of the plurality of bulk picks for selecting one or more of the items in the customer order from the one or more carousels.

22. The method of claim 21, wherein the pick tour generating subsystem comprises
a map unit for storing a map having map data associated therewith that corresponds to a location of each of the items in a warehouse, a cart building unit for generating information associated with a mobile cart for use by a pick agent, wherein the mobile cart has a plurality of totes associated therewith and wherein each of the plurality of totes includes identification information, and a pick tour generator for generating the pick tour plan having the pick instructions based on the value ordered tree graph and the map data, wherein the pick tour plan correlates items of the customer orders at multiple selected locations in the warehouse with one or more of the plurality of totes in the mobile cart, wherein, the cart building unit determines the number of totes for the mobile cart and the identification information associated with each of the plurality of totes based on the pick tour plan.

23. The method of claim 22, further comprising generating the pick tour plan by mapping the consolidated order fulfillment data generated by the order generating unit with the warehouse configuration stored in the map unit via the graph generating unit.

24. The method of claim 23, further comprising converting with the pick tour generator the pick tour plan into the pick tour having the pick instructions, wherein the pick instructions of the pick tour includes an ordered list of pick tasks.

25. The method of claim 21, wherein the bulk pick order fulfillment unit includes processing hardware that is configured to:

map the one or more items in each of the plurality of customer orders to product identification data, generate one or more bulk picks having associated therewith one or more bulk pick recipes from the data associated with the customer orders, wherein each of the bulk pick recipes includes a selected quantity of the one or more items from the plurality of customer orders and a selected quantity of one or more additional items, and generate a bulk pick ticket associated with each of the bulk picks.

26. The method of claim 25, wherein the bulk pick ticket includes information about the one or more items in the bulk pick recipe, and location information associated with the location of the one or more items in the warehouse.

* * * * *